US012099364B2

(12) United States Patent
Takeshita

(10) Patent No.: US 12,099,364 B2
(45) Date of Patent: Sep. 24, 2024

(54) TRAJECTORY GENERATION SYSTEM, TRAJECTORY GENERATION METHOD, AND PROGRAM

(71) Applicant: TOYOTA JIDOSHA KABUSHIKI KAISHA, Toyota (JP)

(72) Inventor: Keisuke Takeshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 327 days.

(21) Appl. No.: 17/705,716

(22) Filed: Mar. 28, 2022

(65) Prior Publication Data

US 2022/0317696 A1 Oct. 6, 2022

(30) Foreign Application Priority Data

Mar. 31, 2021 (JP) ................................. 2021-059244

(51) Int. Cl.
*G05D 1/00* (2024.01)
*G06N 3/04* (2023.01)

(52) U.S. Cl.
CPC .......... *G05D 1/0221* (2013.01); *G05D 1/0238* (2013.01); *G06N 3/04* (2013.01)

(58) Field of Classification Search
CPC ........ G06N 3/04; G06N 3/0455; G06N 20/00; G05D 1/0221; G05D 1/0238
See application file for complete search history.

(56) References Cited

U.S. PATENT DOCUMENTS

2020/0189101 A1 6/2020 Terada
2021/0001481 A1\* 1/2021 Hayashi ............. G05B 13/0265

FOREIGN PATENT DOCUMENTS

JP 2020-093364 A 6/2020

OTHER PUBLICATIONS

Qureshi Ahmed et al., "Motion Planning Networks", https://arxiv.org/abs/1806.05767, arXiv:1806.05767v2, 7 pages, Feb. 24, 2019.

\* cited by examiner

*Primary Examiner* — Huan Le
(74) *Attorney, Agent, or Firm* — Dinsmore & Shohl LLP

(57) ABSTRACT

A trajectory generation system capable of deciding a high-quality trajectory is provided. The trajectory generation system includes an environmental feature information acquisition unit and a trajectory generation unit. The environmental feature information acquisition unit acquires environmental feature information that indicates features of an environment around a moving object. The trajectory generation unit inputs a start state and a target state of the moving object and environmental feature information into a learned model that is generated by machine learning in advance and is used to generate a trajectory along which the moving object can move in the environment, and generates, for each of a plurality of different values of a first parameter that is set in the learned model and can be changed, a trajectory using the learned model.

5 Claims, 14 Drawing Sheets

TRAJECTORY GENERATION SYSTEM, TRAJECTORY GENERATION METHOD, AND PROGRAM

CROSS REFERENCE TO RELATED APPLICATIONS

This application is based upon and claims the benefit of priority from Japanese patent application No. 2021-059244, filed on Mar. 31, 2021, the disclosure of which is incorporated herein in its entirety by reference.

BACKGROUND

The present disclosure relates to a trajectory generation system, a trajectory generation method, and a program, and, in particular, to a trajectory generation system, a trajectory generation method, and a program for generating a trajectory of a moving object.

Japanese Unexamined Patent Application Publication No. 2020-093364 discloses a trajectory generation apparatus including a computing unit that performs computations for generating a trajectory on which a mobile body or a gripper of the mobile body is moved from a start position to a target position, and an evaluating unit that performs evaluation on the trajectory. In the trajectory generation apparatus according to Japanese Unexamined Patent Application Publication No. 2020-093364, the computing unit generates a plurality of trajectory candidates leading to a target area including the target position and a vicinity of the target position with a plurality of degrees of freedom associated with predetermined grip conditions within a predetermined range.

SUMMARY

In the technique disclosed in Japanese Unexamined Patent Application Publication No. 2020-093364, a plurality of trajectory candidates leading to the target area including the vicinity of the target position are generated. However, if a plurality of trajectories are generated according to the above method, it is possible that a trajectory that does not reach the target position may be generated. Therefore, according to the technique disclosed in Japanese Unexamined Patent Application Publication No. 2020-093364, it is possible that a high-quality trajectory cannot be decided.

The present disclosure provides a trajectory generation system, a trajectory generation method, and a program capable of deciding a high-quality trajectory.

A trajectory generation system according to the present disclosure is a trajectory generation system that generates a trajectory of a moving object that moves in an environment, the trajectory generation system comprising: an environmental feature information acquisition unit configured to acquire environmental feature information indicating features of the environment around the moving object; and a trajectory generation unit configured to input a start state and a target state of the moving object, and the environmental feature information into a learned model that is generated by machine learning in advance and is used to generate a trajectory along which the moving object can move in the environment, and generate, for each of a plurality of different values of a first parameter that is set in the learned model and can be changed, a trajectory using the learned model.

Further, a trajectory generation method according to the present disclosure is a trajectory generation method for generating a trajectory of a moving object that moves in an environment, the trajectory generation method comprising: acquiring environmental feature information indicating features of the environment around the moving object; and inputting a start state and a target state of the moving object, and the environmental feature information into a learned model that is generated by machine learning in advance and is used to generate a trajectory along which the moving object can move in the environment, and generating, for each of a plurality of different values of a first parameter that is set in the learned model and can be changed, a trajectory using the learned model.

Further, a program according to the present disclosure causes a computer to execute the following processing of: acquiring environmental feature information indicating features of an environment around a moving object; and inputting a start state and a target state of the moving object, and the environmental feature information into a learned model that is generated by machine learning in advance and is used to generate a trajectory along which the moving object can move in the environment, and generating, for each of a plurality of different values of a first parameter that is set in the learned model and can be changed, a trajectory using the learned model.

In the present disclosure, a start state and a target state of a moving object and environmental feature information are input into a learned model, whereby a trajectory is generated. Accordingly, according to the present disclosure, a collision with an obstacle indicated in the environmental feature information is prevented, and the trajectory from the start state to the target state may be generated. Further, the trajectory is generated using a learned trajectory generation model for each of a plurality of different values of a first parameter that can be changed. Accordingly, in the present disclosure, a plurality of trajectories may be generated. Therefore, in the present disclosure, a high-quality trajectory may be decided from the plurality of trajectories that have been generated.

Further, the first parameter may be such a parameter that a variation in the output of the learned model for one input value input into the learned model is changed in accordance with a change in the value of the first parameter.

With the above configuration, in the present disclosure, a large variety of trajectories may be generated.

Further, the trajectory generation unit may increase the number of times a trajectory is generated by inputting the same start state and target state, and the same environmental feature information into the learned model when a value of the first parameter such that the variation in the output of the learned model becomes larger is set in the learned model.

With the above configuration, in the present disclosure, many trajectories can be efficiently generated.

Further, the first parameter may be a dropout rate in the learned model where a dropout layer is provided, and the trajectory generation unit may generate a plurality of trajectories by generating a trajectory using the learned model for each of the dropout rates.

With the above configuration, in the present disclosure, a large variety of trajectories may be generated.

Further, a parameter setting unit capable of setting each of a plurality of values of the first parameter that are different from one another in the learned model may be further provided.

With the above configuration, in the present disclosure, the parameter of the learned model may be easily changed.

According to the present disclosure, it is possible to provide a trajectory generation system, a trajectory generation method, and a program capable of deciding a high-quality trajectory.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Hereinafter, with reference to the drawings, an embodiment of the present disclosure will be described. For the clarification of the description, the following description and the drawings are omitted and simplified as appropriate. Further, throughout the drawings, the same elements are denoted by the same reference symbols, and overlapping descriptions are omitted as appropriate.

Figure 1:
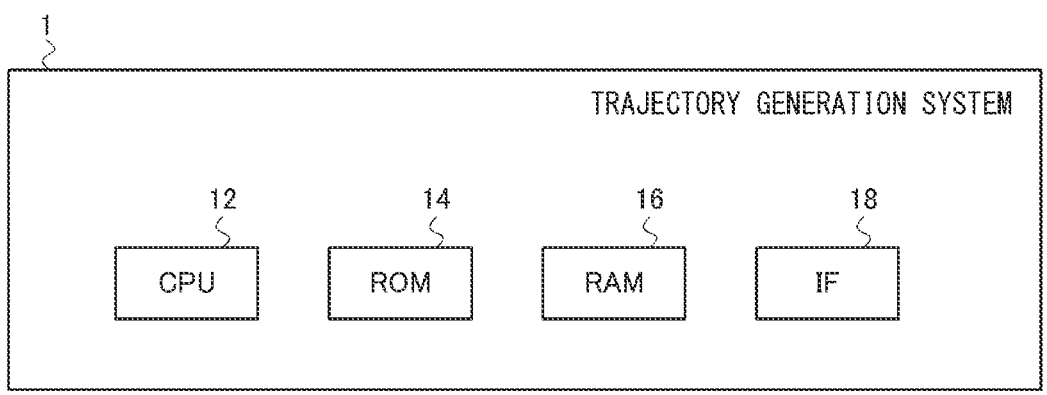
FIG. 1 is a diagram showing a hardware configuration of a trajectory generation system according to a first embodiment.

FIG. 1 is a diagram showing a hardware configuration of a trajectory generation system 1 according to the first embodiment. The trajectory generation system 1 generates a trajectory of a moving object. The moving object moves in an environment. The moving object may be the one that moves in an environment that corresponds to the real space or may be the one that moves in an environment that corresponds to a virtual space. When the moving object moves in the real space, the moving object may be a real machine that is physically present. Further, when the moving object moves in the virtual space, the moving object may be a virtual object that is present in the virtual space implemented by a simulation. Further, the moving object may be, for example, a mobile body such as a robot or may be a gripper (e.g., a robot hand) provided in the mobile body. Further, the moving object which is a gripper may be, for example, a robot arm (a manipulator) of an industrial robot or the like. Further, the mobile body may be a vehicle or may be a flying object that flies in the space.

Further, the trajectory generation system 1 may be implemented by one or more computers. The trajectory generation system 1 may be implemented by a cloud system. Further, when the moving object moves in the real space, the trajectory generation system 1 may be implemented by a computer mounted on the moving object. Further, when the moving object moves in the virtual space, the trajectory generation system 1 may be implemented by a computer that implements the virtual space.

Further, the trajectory may be a path (trace) along which the moving object can move in the environment. Further, the trajectory may be a trace (change) of states of the moving object from a start state to a target state of the moving object. The start state indicates the state of the moving object at the start of the trajectory. Further, the target state indicates the state of the moving object at the goal of the trajectory. The number of elements indicating the state of the moving object may be the number of feature amounts (the number of dimensions) of the moving object. The number of features amounts (the number of dimensions) of the moving object corresponds to the degree of freedom of the moving object. When the number of dimensions of the features of the state of the moving object (the degree of freedom of the moving object) is denoted by m, the state of the moving object is indicated by a point (expressed by a feature amount vector) in the m-dimensional space. Then, the trajectory of the moving object may be regarded as a trace of points indicated by feature amount vectors in the m-dimensional space.

When the moving object is a mobile body, the trajectory may be a trace of the position of the mobile body. Further, when the moving object is a gripper, the trajectory may be a trace of the position of the tip of the gripper. In these cases, the "state" of the moving object corresponds to the position of the moving object. Further, in the above cases, the trajectory may be a trace of the position of the moving object from the start position (start state) to the target position (target state) of the moving object. In the above cases, the position (state) of the moving object may be indicated by the position coordinates, which are elements of the position (state). When, for example, the position coordinates are indicated by position coordinates (x, y, z) in a three-dimensional space, the number of feature amounts (the number of dimensions) of the position (state) of the moving object is three. Further, the position coordinates (x, y, z) may indicate the point expressed by the feature amount vector in the three-dimensional space.

Further, when the moving object is a gripper and the goal of the trajectory is a certain posture of the gripper, the trajectory may be a trace of the posture of the gripper. In this case, the "state" of the moving object corresponds to the posture of the moving object. Further, in the above case, the trajectory may be a trace of the posture of the moving object from the start posture (start state) to the target posture (target state) of the moving object. The gripper includes a plurality of joints. In this case, the posture (state) of the moving object may be indicated by a set of joint angles, which are elements of the posture (state). When, for example, the number of joints of the gripper is two and the angles of the joints are indicated by $\varphi 1$ and $\varphi 2$, the posture (state) of the moving object is indicated by the feature amount vector ($\varphi 1$, $\varphi 2$) and the number of feature amounts (the number of dimensions) is 2. Further, this posture ($\varphi 1$, $\varphi 2$) may indicate the point expressed by the feature amount vector in the two-dimensional space.

Further, when the moving object is a mobile body that includes a gripper and the goal of the trajectory is a certain posture of the gripper at the destination of the mobile body, the trajectory may be a trace of the position/posture of the mobile body and the posture of the gripper. In this case, the "state" of the moving object corresponds to the position and the posture of the moving object. Further, in this case, the trajectory may be a trace of the position/posture of the moving object from the start position posture (start state) to the target position posture (target state) of the moving object. In this case, the position/posture (state) of the moving object may be indicated by a set of the position coordinates of the mobile body, the turning angle of the mobile body (the orientation of the mobile body), and angles of joints of the gripper. When, for example, the position coordinates of the mobile body are denoted by (x, y), the turning angle of the mobile body is denoted by θ, and the angles of the three joints of the gripper are denoted by ($\varphi 1$, $\varphi 2$, $\varphi 3$), the position/posture (state) of the moving object are indicated by a feature amount vector (x, y, θ, $\varphi 1$, $\varphi 2$, $\varphi 3$), where the number of feature amounts (the number of dimensions) is 6. Further, this state of the moving object (x, y, θ, $\varphi 1$, $\varphi 2$, $\varphi 3$) may indicate the point expressed by a feature amount vector in the six-dimensional space.

The trajectory generation system 1 includes, as a main hardware configuration, a Central Processing Unit (CPU) 12, a Read Only Memory (ROM) 14, a Random Access Memory (RAM) 16, and an interface unit (IF) 18. The CPU 12, the ROM 14, the RAM 16, and the interface unit 18 are connected to one another via a data bus. The trajectory generation system 1 may include a Graphics Processing Unit (GPU) as a hardware configuration.

The CPU 12 has functions as an arithmetic apparatus (a processing device or a processor) that performs, for example, control processing and arithmetic processing. The arithmetic apparatus may be implemented by a GPU. The ROM 14 has a function as a storage for storing, for example, a control program(s) and an arithmetic program(s) executed by the CPU 12 (GPU). The RAM 16 has a function as a memory that temporarily stores processing data and the like. The interface unit 18 externally receives/outputs signals through a wire or wirelessly. Further, the interface unit 18 accepts an operation for inputting data performed by a user and performs processing for displaying information for the user. The interface unit 18 may display, for example, the generated trajectory.

Figure 2:
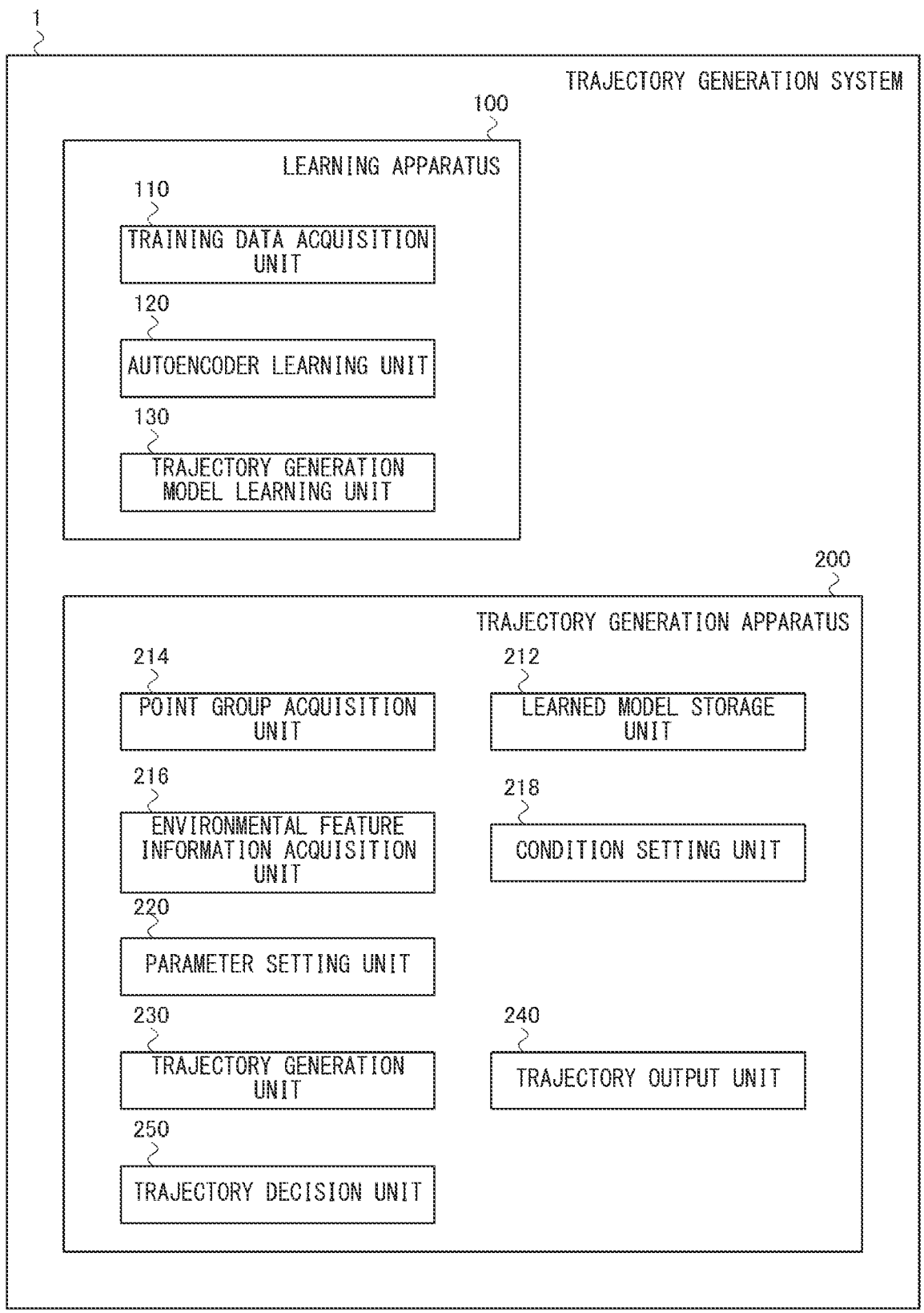
FIG. 2 is a functional block diagram showing a configuration of the trajectory generation system according to the first embodiment.

FIG. 2 is a functional block diagram showing a configuration of the trajectory generation system 1 according to the first embodiment. The trajectory generation system 1 includes a learning apparatus 100 and a trajectory generation apparatus 200. Note that the learning apparatus 100 and the trajectory generation apparatus 200 may be formed of a physically integrated apparatus. Alternatively, the learning apparatus 100 and the trajectory generation apparatus 200 may be formed of apparatuses physically separated from each other. In the latter case, each of the learning apparatus 100 and the trajectory generation apparatus 200 may have a hardware configuration shown in FIG. 1. When, for example, the moving object is implemented by a real machine, the trajectory generation apparatus 200 may be implemented by a computer mounted on a moving object and the learning apparatus 100 may be implemented by a computer (e.g., a personal computer) that is separated from the moving object.

The learning apparatus 100 performs processing of learning an autoencoder and a trajectory generation model. The autoencoder may be implemented by, for example, a neural network. The autoencoder is used to generate (extract) environmental feature information indicating features of the environment from the three-dimensional point group (point group data) indicating environmental objects, which are the respective objects in the environment where the moving object is present (objects other than a moving object), environmental feature information indicating features of the environment. The details thereof will be described later. When the trajectory of the moving object is generated, the environmental feature information corresponds to obstacle information, which indicates features of the obstacle that the moving object should avoid.

Further, the three-dimensional point group (i.e., three-dimensional point cloud) indicates position coordinates of respective points of respective substances (i.e., objects) in the environment where the moving object is present. The three-dimensional point group may be generated depending on the distance from one viewpoint in the environment to each point of the surface of the substance (i.e., object) in the environment and the direction from this viewpoint to each point. The three-dimensional point group is obtained, for example, by a camera mounted on the moving object (e.g., an RGB-D camera or a Light Detection and Ranging (LiDAR)) or a sensor (hereinafter it will be referred to as a "camera or the like" or more simply a "camera").

Further, the trajectory generation model may be implemented, for example, by a machine learning algorithm such as a neural network. The trajectory generation model is used to generate a trajectory along which the moving object can move in the environment. The trajectory may be generated by inputting a start state, a target state, and environmental feature information into the trajectory generation model. The details thereof will be described later.

The trajectory generation apparatus 200 generates a trajectory of the moving object using the autoencoder and the trajectory generation model learned by the learning apparatus 100. In this embodiment, the trajectory generation apparatus 200 is configured to generate a plurality of trajectories for one start state and one target state. Specifically, the trajectory generation apparatus 200 (trajectory generation system 1) according to this embodiment generates, for each of a plurality of different values of a variable parameter (first parameter) that is set in the trajectory generation model (learned model) and can be changed, a trajectory using the trajectory generation model. Accordingly, the trajectory generation apparatus 200 (trajectory generation system 1) according to this embodiment generates a plurality of trajectories. The details thereof will be described later.

The learning apparatus 100 includes a training data acquisition unit 110, an autoencoder learning unit 120, and a trajectory generation model learning unit 130. Further, the trajectory generation apparatus 200 includes a learned model storage unit 212, a point group acquisition unit 214, an environmental feature information acquisition unit 216, a condition setting unit 218, a parameter setting unit 220, a trajectory generation unit 230, a trajectory output unit 240, and a trajectory decision unit 250. These components can be implemented, for example, by the CPU 12 executing a program stored in the ROM 14. Further, each of the components may be implemented by storing necessary programs in a desired non-volatile storage medium in advance and installing them as required. Note that the implementation of each component is not limited to the above-described software implementation and may be implemented by hardware such as some type of circuit devices. Further, at least one of the aforementioned components may be implemented by physically-separate individual hardware.

<Learning Processing>

The learning processing (learning stage) will be described. In the learning apparatus 100, the training data acquisition unit 110 acquires a large number of pieces of training data that is required for the learning of the autoencoder and the trajectory generation model. The training data indicates, for example, a teacher environment (i.e., learning environment) and a teacher trajectory (i.e., ground true trajectory) that passes within the teacher environment. Further, the training data may include three-dimensional point group data obtained from a viewpoint in the teacher environment. Note that the teacher environment may be an environment in the real space or may be an environment in the virtual space. Further, for example, the teacher environment includes a floor surface, and other environmental objects. For example, data indicating the teacher environment (teacher environmental data) may indicate the position coordinates of the floor surface and the other environmental objects. Further, data indicating the teacher trajectory (teacher trajectory data) may indicate the trace of the state of the moving object from the start state to the target state of the moving object in the teacher environment.

The teacher trajectory is generated in such a way that the moving object does not collide with environmental objects such as obstacles. That is, the teacher trajectory may be generated under a condition that it has been recognized where in the environment the environmental objects are present. In some embodiments, the teacher trajectory may be generated by a method other than a method that uses machine learning.

The autoencoder learning unit 120 performs processing of learning the autoencoder using the three-dimensional point group data included in the training data. Specifically, the autoencoder learning unit 120 performs processing of learning the autoencoder so that the autoencoder receives the three-dimensional point group in the training data and outputs the three-dimensional point group. That is, the autoencoder learning unit 120 may perform processing of learning the autoencoder using the three-dimensional point group as input data and the three-dimensional point group as a ground truth label (i.e., correct answer label).

The learned autoencoder compress (reduces) the dimension of the three-dimensional point group at the time of encoding. Accordingly, the learned autoencoder is configured to output, when three-dimensional point group data in a certain environment is input, environmental feature information indicating the features of the environment by extracting the feature amount of the dimension that has been compressed. Therefore, the dimension of the environmental feature information becomes smaller than the dimension of the three-dimensional point group. That is, the autoencoder makes the dimension of the features of the environment smaller than the dimension of the three-dimensional point group. The autoencoder may be configured to output the environmental feature information by compressing the three-dimensional point group data. The autoencoder may be further configured to extract the feature amount that corresponds to the environmental feature information from the feature amount of the three-dimensional point group.

As described above, by performing the processing of learning the trajectory generation model that will be described later using environmental feature information whose dimension is smaller than that of the features of the three-dimensional point group, the learning processing may be efficiently performed. Compressing the dimension of the three-dimensional point group using the autoencoder is not an absolutely necessary configuration. When the autoencoder is not used, in the learning processing that will be described later, the three-dimensional point group data, not the environmental feature information generated using the autoencoder, may be input into the trajectory generation model as the environmental feature information.

The trajectory generation model learning unit 130 performs the processing of learning the trajectory generation model using the teacher trajectory data included in the training data, the teacher environmental data indicating the teacher environment when the teacher trajectory data has been generated, and the learned autoencoder. As described above, the trajectory generation model may be implemented, for example, by a machine learning algorithm such as a neural network. In the following description, an example in which the trajectory generation model is implemented by a neural network will be described. The specific processing of the trajectory generation model learning unit 130 will be described later.

In this embodiment, the trajectory generation model receives the environmental feature information, the target state of the moving object, and a certain state (assume it is the current state $S_n$) of the moving object and outputs a state $S_{n+1}$ that is next to the current state $S_n$. Specifically, the trajectory generation model receives the feature amount vectors of the current state $S_n$ and the target state $S_N$, and the environmental feature information and outputs the feature amount vector of the state $S_{n+1}$, which is next to the state $S_n$. Note that N is an index indicating the target state. The symbol n, which is an index indicating the order of the state from the start state in the trajectory to be generated, is an index from 0 to N.

Then, by repeating the processing of inputting the current state and the target state of the moving object, and the environmental feature information into the learned trajectory generation model to cause a state that is next to the current state to be output, a trajectory that corresponds to the trace of the state may be generated. That is, at the initial stage, the start state is set as the current state, and the start state (the current state) and the target state, and the environmental feature information are input into the learned trajectory generation model, as a result of which the state that is next to the current state is output. Then, processing similar to the one stated above is performed by setting the next state that has been output as the current state, whereby the further next state is output. By repeating the above processing, a trajectory from the start state to the target state is generated.

Figure 3:
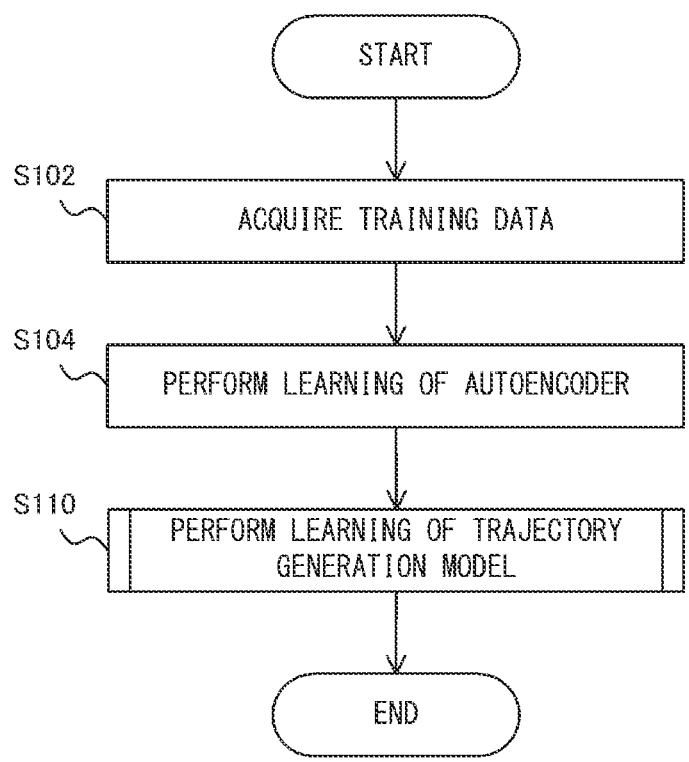
FIG. 3 is a flowchart showing a learning method executed by a learning apparatus according to the first embodiment.

FIG. 3 is a flowchart showing a learning method executed by the learning apparatus 100 according to the first embodiment. FIG. 3 shows a flow of learning processing executed by the learning apparatus 100. As described above, the training data acquisition unit 110 acquires training data that is necessary for the learning of the autoencoder and the trajectory generation model (Step S102). As described above, the autoencoder learning unit 120 performs learning of the autoencoder using three-dimensional point group data included in the training data (Step S104). The trajectory generation model learning unit 130 performs learning of the trajectory generation model (Step S110). Note that the trajectory generation model learning unit 130 executes the processing of S110 for each of the plurality of teacher trajectories. In some embodiments, the trajectory generation model learning unit 130 executes the processing of S110 for all the teacher trajectories that have been acquired. Accordingly, a trajectory generation model with a high accuracy that is able to generate a trajectory that can satisfactorily prevent the moving object from colliding with an obstacle in the environment may be generated.

Figure 4:
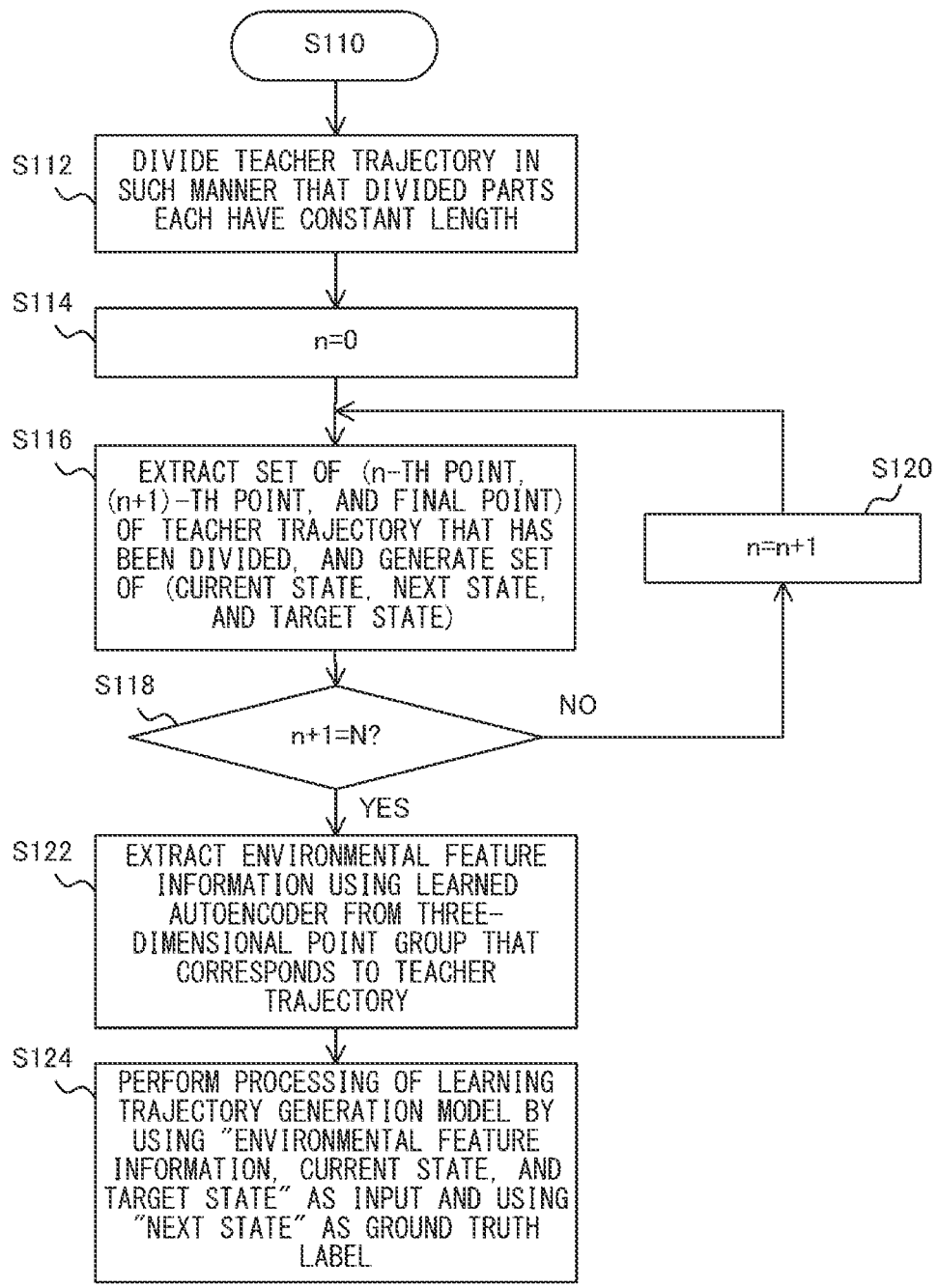
FIG. 4 is a flowchart showing trajectory generation model learning processing executed by a trajectory generation model learning unit according to the first embodiment.

FIG. 4 is a flowchart showing trajectory generation model learning processing (S110) executed by the trajectory generation model learning unit 130 according to the first embodiment. The trajectory generation model learning unit 130 divides the teacher trajectory in such a manner that the divided parts each have a constant length (Step S112). The number of divisions of the teacher trajectory is denoted by N. The term "length" may correspond to the distance between a point and another point indicated by feature amount vectors in the m-dimensional space when the number of dimensions of the features of the state of the moving object regarding the teacher trajectory is denoted by m. While the teacher trajectory is divided in such a manner that the divided parts each have a constant length in this embodiment, each length of the teacher trajectory after being divided may not be constant. For example, the teacher trajectory may be divided in such a manner that the divided parts have desired lengths within a predetermined range.

Figure 5:
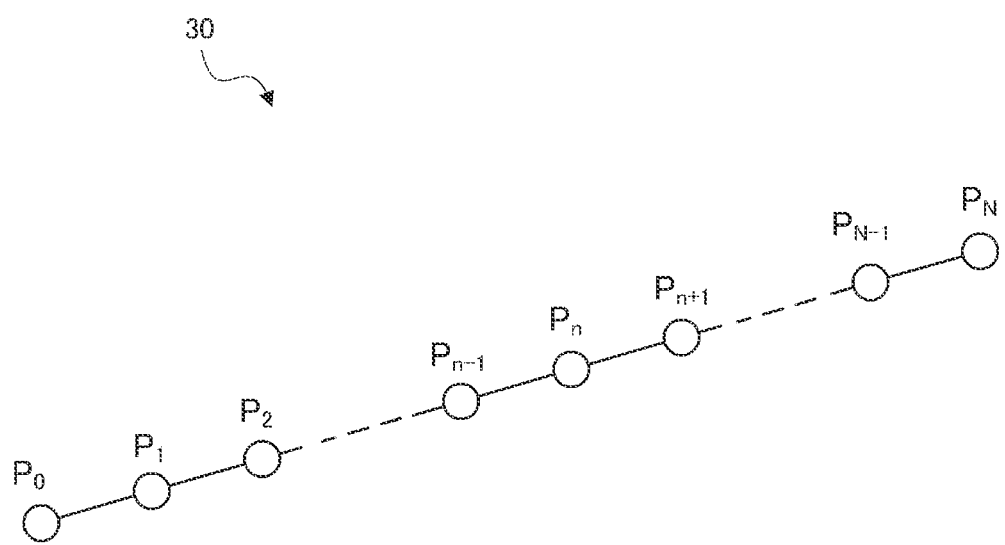
FIG. 5 is a diagram for describing processing of dividing a teacher trajectory according to the first embodiment.

FIG. 5 is a diagram for describing processing of dividing the teacher trajectory (S112) according to the first embodiment. FIG. 5 illustrates a teacher trajectory 30. When the number of dimensions of the features of the state of the moving object regarding the teacher trajectory is m, FIG. 5 shows a teacher trajectory 30 in the m-dimensional space.

A division point, which is a point when the teacher trajectory 30 is divided, is denoted by $P_n$. The symbol n is an index indicating the order of division points from the start state of the teacher trajectory 30. Further, n is an integer from 0 to N. The division point $P_0$ may correspond to the feature amount vector of the start state and the division point $P_N$ may correspond to the feature amount vector of the target state. Therefore, division points $P_0$, $P_1$, $P_2$, ..., $P_{n-1}$, $P_n$, $P_{n+1}$, ..., $P_{N-1}$, $P_N$ are arranged on the teacher trajectory 30. The symbol $P_n$ corresponds to the feature amount vector of the state of the n-th division point from the start state.

Reference is made once again to FIG. 4, and the explanation of the flowchart shown in FIG. 4 will be continued. The trajectory generation model learning unit 130 confirms that n=0 (Step S114), extracts a set of states of (the n-th point, the (n+1)-th point, and the final point) of the teacher trajectory that has been divided, and generates a set of states of (the current state, the next state, and the target state) (Step S116). When n+1=N is not established (NO in Step S118), n is incremented by 1 (Step S120) and the processing of S116 is performed. Then, when n+1 becomes equal to N (YES in S118), the processing of S116 is ended and the following processing is performed.

By repeating the processing of S116 as described above, for each of n=0 to N-1, the set of states of (the n-th point, the (n+1)-th point, and the final point) is generated as the set of states of (the current state, the next state, and the target state). For example, for n=0, the set of states (the 0-th point $P_0$, the first point $P_1$, and the final point $P_N$) is generated as the set of states (the current state, the next state, and the target state). Further, for n=1, for example, the set of states (the first point $P_1$, the second point $P_2$, and the final point $P_N$) is generated as the set of states (the current state, the next state, and the target state).

The trajectory generation model learning unit 130 extracts the environmental feature information using the learned autoencoder from the three-dimensional point group that corresponds to the teacher trajectory (Step S122). Specifically, the trajectory generation model learning unit 130 inputs the three-dimensional point group obtained in the teacher environment through which the teacher trajectory has passed when this teacher trajectory was created into the autoencoder learned in the processing of S104. Accordingly, the environmental feature information is output from the autoencoder, whereby the trajectory generation model learning unit 130 is able to extract the environmental feature information that corresponds to the teacher trajectory. As a result of the processing of S116 and the processing of S122, the input data of the trajectory generation model and the output data (ground truth label) that corresponds to this input data are obtained, as will be described later.

The trajectory generation model learning unit 130 performs the processing of learning the trajectory generation model by using "the environmental feature information, the current state, and the target state" as the input data and using the "next state" as the ground truth label (Step S124). Specifically, the trajectory generation model learning unit 130 inputs the environmental feature information extracted in S122 and the "current state" and the "target state" of one set of states into the trajectory generation model before learning. Then, the trajectory generation model learning unit 130 optimizes various kinds of parameters (e.g., weight and bias) of the trajectory generation model in such a way that the difference (error) between the "next state" of the set of states and the output from the trajectory generation model becomes small.

For example, in the example shown in FIG. 5, the trajectory generation model learning unit 130 inputs the extracted environmental feature information and the feature amount vectors that correspond to the "0-th point $P_0$" and the "final point $P_N$" of the set of states that correspond to n=0 into the trajectory generation model before learning. Then, the trajectory generation model learning unit 130 optimizes various kinds of parameters of the trajectory generation model in such a way that the difference (error) between the feature amount vector that corresponds to the "first point $P_1$", which is the "(n+1)-th point" in the set of states that correspond to n=0, and the feature amount vector output from the trajectory generation model becomes small. Likewise, the trajectory generation model learning unit 130 inputs the extracted environmental feature information and the feature amount vectors that correspond to the "first point $P_1$" and the "final point $P_N$" of the set of states that correspond to n=1 into the trajectory generation model before learning. Then, the trajectory generation model learning unit 130 optimizes various kinds of parameters of the trajectory generation model in such a way that the difference (error) between the feature amount vector that corresponds to the "second point $P_2$", which is the "(n+1)-th point" in the set of states that correspond to n=1, and the feature amount vector output from the trajectory generation model becomes small. In the same manner, the trajectory generation model learning unit 130 performs learning processing for all the sets of states. That is, the trajectory generation model learning unit 130 inputs the environmental feature information, and the feature amount vectors that correspond to a certain point $P_n$ and the final point $P_N$ into the trajectory generation model. Then, the trajectory generation model learning unit 130 optimizes various kinds of parameters of the trajectory generation model in such a way that the difference (error) between the feature amount vector that corresponds to the point $P_{n+1}$, which is next to the point $P_n$, and the feature amount vector output from the trajectory generation model becomes small.

In this embodiment, the trajectory generation model learning unit 130 is configured to perform learning of the trajectory generation model by inputting the environmental feature information into the trajectory generation model before learning. The environmental feature information may indicate the environmental object that may become an obstacle that disturbs the movement of the moving object in the environment. Therefore, the trajectory generation model learning unit 130 is able to generate a trajectory generation model so as to generate a trajectory that can prevent the moving object from colliding with the obstacle by learning processing.

Figure 6:
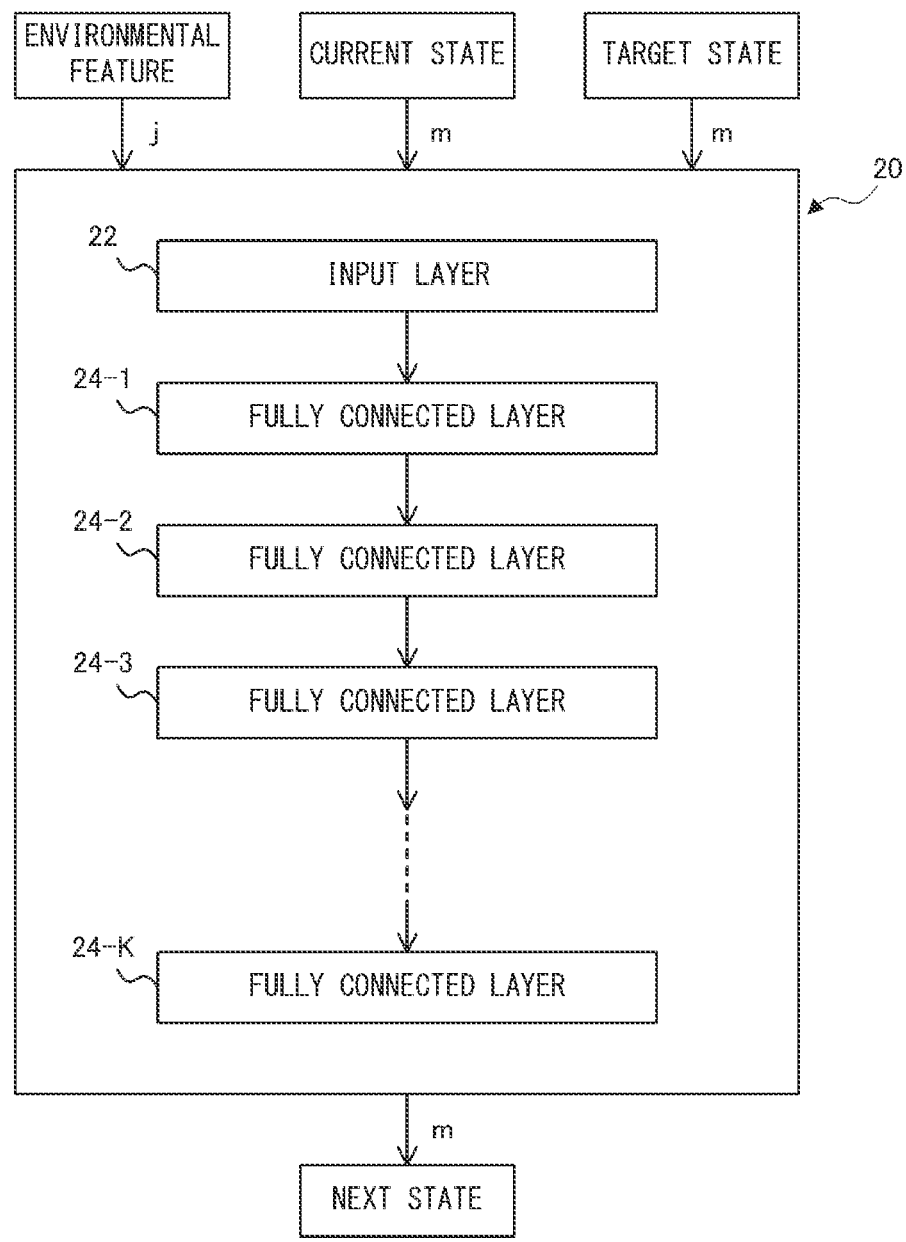
FIG. 6 is a diagram schematically illustrating a trajectory generation model according to the first embodiment.

FIG. 6 is a diagram schematically illustrating the trajectory generation model 20 according to the first embodiment. As described above, the trajectory generation model 20 may be constructed by, for example, a neural network. As described above, upon receiving the environmental feature information, the current state, and the target state, the trajectory generation model 20 outputs the next state.

The trajectory generation model 20 is composed of, for example, one input layer 22 and a plurality of fully connected layers 24-1 to 24-K (K is an integer equal to or larger than two). A dropout layer is provided in the fully connected layer 24. The fully connected layer 24 may include the dropout layer. By setting a dropout rate in the dropout layer, neurons (nodes) of the corresponding fully connected layer 24 and its coupling are randomly disabled at a percentage in accordance with the set dropout rate. Accordingly, at the stage of learning the trajectory generation model 20, overfitting can be prevented. Note that the dropout rate that is set at the learning stage may be a desired value. Further, since the dropout layer is provided in the fully connected layer 24 of the trajectory generation model 20, the dropout layer is provided in the learned trajectory generation model (learned model) used in trajectory generation processing that will be described later.

The number of dimensions of the features of the environmental feature information is denoted by j and the number of dimensions of the features of the state is denoted by m. In this case, the number of dimensions (the number of nodes) of the input layer 22 becomes j+m+m. Then, the number of dimensions of the fully connected layer 24-1 may be larger than j+m+m. Then, the number of dimensions of the fully connected layer 24 may decrease as it goes down to a fully connected layer 24 at a later stage. Then, the number of dimensions of the fully connected layer 24-K at the final stage is m, which is the same as the number of dimensions of the features of the next state.

<Trajectory Generation Processing>

Next, trajectory generation processing (inference processing) will be described. As a result of the trajectory generation processing, a trajectory of the moving object is generated. In the trajectory generation apparatus 200, the learned model storage unit 212 stores the learned model learned by the learning apparatus 100. Specifically, the learned model storage unit 212 stores the autoencoder learned by the autoencoder learning unit 120. The learned model storage unit 212 further stores the trajectory generation model learned by the trajectory generation model learning unit 130.

The point group acquisition unit 214 acquires a three-dimensional point group that corresponds to the environment around the moving object. Specifically, the point group acquisition unit 214 acquires a three-dimensional point group in an environment (target environment) in which the moving object whose trajectory is to be generated is present and where the trajectory is to be generated. For example, the point group acquisition unit 214 may acquire a three-dimensional point group from the viewpoint of the moving object which is in the start state. In this case, the point group acquisition unit 214 may acquire the three-dimensional point group by, for example, a camera mounted on the moving object which is in the start state. The point group acquisition unit 214 is not limited to acquire a three-dimensional point group by a camera or the like mounted on the moving object. The point group acquisition unit 214 may acquire the three-dimensional point group by, for example, a camera that is physically located apart from the moving object. The point group acquisition unit 214 may acquire the three-dimensional point group by, for example, an infrastructure sensor installed in the target environment.

The environmental feature information acquisition unit 216 acquires the environmental feature information indicating the features of the environment around the moving object using the three-dimensional point group. Specifically, the environmental feature information acquisition unit 216 acquires the environmental feature information using the acquired three-dimensional point group and the learned autoencoder stored in the learned model storage unit 212. Further specifically, the environmental feature information acquisition unit 216 acquires the environmental feature information by inputting the acquired three-dimensional point group into the learned autoencoder. Accordingly, the environmental feature information is extracted from the three-dimensional point group.

As described above, the autoencoder is configured to compress (reduce) the dimension of the three-dimensional point group, thereby outputting environmental feature information indicating the features of the compressed dimension. Therefore, the number of dimensions of the features of the environmental feature information is smaller than the number of dimensions of the three-dimensional point group.

As described above, compressing the dimension of the three-dimensional point group using an autoencoder is not an absolutely necessary configuration. When an autoencoder is not used, three-dimensional point group data, not environmental feature information, may be input into the trajectory generation model in trajectory generation processing that will be described later. Further, in this case, the three-dimensional point group functions as environmental feature information indicating the features of the environment around the moving object. Therefore, the point group acquisition unit 214 functions as an environmental feature information acquisition unit.

The condition setting unit 218 sets a constraint condition in the trajectory to be generated. The constraint condition that is set is, for example, the start state and the target state, which indicate the states of the respective ends of the trajectory. When the current state of the moving object is the start state and a trajectory from this state is generated, the condition setting unit 218 sets the current state as the start state. In the following, a case in which the target state is set will be described. The similar processing is performed also in a case in which the start state is set.

When the moving object is a mobile body and the trajectory is expressed by a trace of the position of the mobile body, the condition setting unit 218 may set the target position of the moving object as the target state. In this case, the condition setting unit 218 may set the position coordinates in the three-dimensional space as the target position.

Further, when the moving object is a gripper, the condition setting unit 218 may set the target posture of the gripper as the target state. In this case, the condition setting unit 218 may set angles of respective joints of the gripper as the target posture. When, for example, a task that the gripper grips a substance in the environment (an environmental object) is to be executed, the condition setting unit 218 sets the target posture, whereby it is possible to set which environmental object the gripper will grip from which direction (e.g., whether to grip the environmental object from the side or to grip it from the top).

Further, when the moving object is a mobile body including a gripper, the condition setting unit 218 may set, as the target state, the target position of the mobile body and the target posture of the gripper. In this case, the condition setting unit 218 may set, as the target state, the position coordinates of the mobile body, the turning angle (orientation) of the mobile body, and the angles of the respective joints of the gripper.

The parameter setting unit 220 sets a value of a parameter (first parameter; variable parameter) that can be changed of the learned trajectory generation model (learned model) in the learned trajectory generation model. The parameter setting unit 220 is able to set each of a plurality of different values of the variable parameter (first parameter) of the learned trajectory generation model in the learned trajectory generation model. According to the above configuration, it becomes possible to easily change the variable parameter (first parameter) of the learned trajectory generation model (learned model).

The "variable parameter (first parameter)" according to this embodiment is such a parameter that a change in the value of this variable parameter may result in a different output value even when one input value is input into the learned trajectory generation model. Further, the above "variable parameter (first parameter)" is such a parameter that the variation in the output value of the trajectory generation model when one input value is input into the learned trajectory generation model is changed in accordance with the change in the value of the variable parameter.

The "variable parameter (first parameter)" is, for example, such a parameter that the greater this value is, the greater the variation in the output value of the trajectory generation model when one input value is input into the learned trajectory generation model. To be more specific, assume a case in which one input value X is input into the trajectory generation model. In this case, when the value of the variable parameter is a minimum (e.g., 0), the output value of the trajectory generation model when the input value X is input remains the same no matter how many times the inference processing is performed. On the other hand, when the value of the variable parameter is made large, the output value of the trajectory generation model when the input value X is input may vary each time the inference processing is performed. The greater the value of the variable parameter is, the greater the variation in the output value is, which means that the difference between the plurality of output values becomes larger.

While the "variable parameter (first parameter)" is, for example, a dropout rate in a neural network, this is merely an example. In the following description of this embodiment, it is assumed that the "variable parameter (first parameter)" is a dropout rate. The dropout rate is generally set at the stage of learning the trajectory generation model in order to prevent, for example, overfitting. On the other hand, the trajectory generation apparatus 200 according to this embodiment is configured to enable the dropout rate of the learned trajectory generation model and change the dropout rate at the inference stage as well.

The parameter setting unit 220 may cause the interface unit 18 to display, for example, a program indicating the trajectory generation model. Accordingly, the user is able to set (change) the value that specifies the dropout rate in the program by operating the interface unit 18. Further, the parameter setting unit 220 may implement an interface that calls a variable that specifies the dropout rate in the program indicating the trajectory generation model. Accordingly, the parameter setting unit 220 is able to set (change) the value of the variable by the interface unit 18. Each of the plurality of values of the dropout rate may be prepared in advance by the user as appropriate. For example, the dropout rates set in the trajectory generation model may be, for example, 0%, 5%, 10%, 15%, 20%, and 25%. The plurality of dropout rates that are set may be prepared in advance by the condition setting unit 218 in accordance with the operation by the user. Further, the value of the dropout rate that is set by the parameter setting unit 220 may be different from the one set at the learning stage.

The trajectory generation unit 230 generates a trajectory from the start state to the target state. In this embodiment, the trajectory generation unit 230 inputs the start state and the target state of the moving object, and the environmental feature information into the learned trajectory generation model (learned model) and generates a trajectory for each of a plurality of different values of the dropout rate (variable parameter) using the learned model. Accordingly, the trajectory generation unit 230 generates a plurality of trajectories from the start state to the target state. That is, the trajectory generation unit 230 generates a plurality of trajectories for a certain constraint condition (the start state and the target state) set by the condition setting unit 218 and a certain environmental feature information acquired by the environmental feature information acquisition unit 216.

Figure 7:
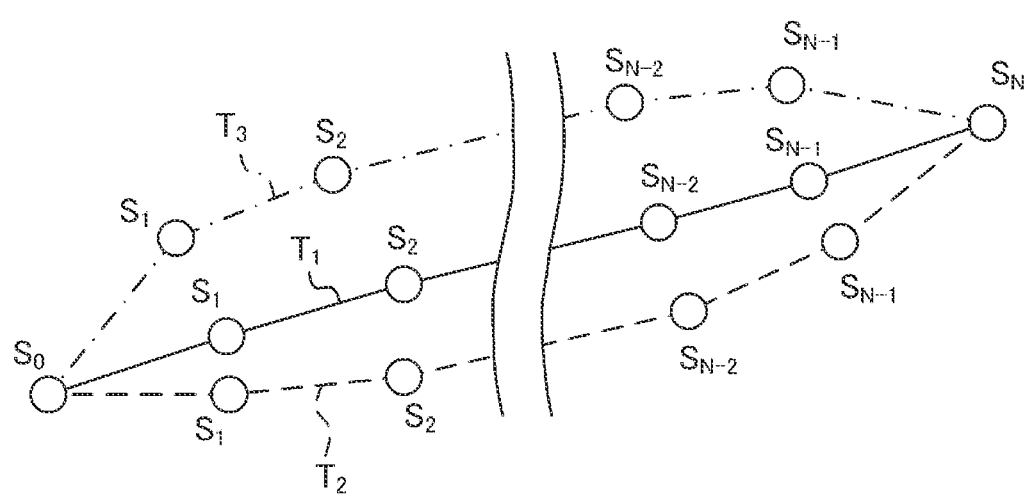
FIG. 7 is a diagram for describing trajectory generation processing of a trajectory generation unit according to the first embodiment.

FIG. 7 is a diagram for describing the trajectory generation processing of the trajectory generation unit 230 according to the first embodiment. If it is assumed that the feature amount vector of the state of the moving object has an m dimensions, FIG. 7 shows an m-dimensional space in a simulated manner (i.e., quasi manner).

The trajectory generation unit 230 inputs the feature amount vectors of the start state $S_0$ and the target state $S_N$, and the environmental feature information into the trajectory generation model (learned model) in which a dropout rate $D_1$ is set. Accordingly, the trajectory generation unit 230 acquires, as the output of the trajectory generation model, the feature amount vector of the state $S_1$, which is next to the start state $S_0$. Then, the trajectory generation unit 230 may input the feature amount vector of the next state $S_1$, which is set as the feature amount vector of the start state, into the trajectory generation model along with the feature amount vector of the target state $S_N$ and the environmental feature information, which are described above. Accordingly, the trajectory generation unit 230 acquires the feature amount vector of the state $S_2$, which is next to the state $S_1$, as an output of the trajectory generation model.

The trajectory generation unit 230 acquires the state from the start state $S_0$ to the target state $S_N$ by repeating the above processing. The trace of the state from the start state $S_0$ to the target state $S_N$ corresponds to the trajectory. In this manner, the trajectory generation unit 230 generates, for the dropout rate $D_1$, a trajectory $T_1$ that corresponds to the start state $S_0$ and the target state $S_N$, and the environmental feature information. The trajectory $T_1$ is shown by a solid line in FIG. 7. As described above, the trajectory generation model has been learned by inputting the environmental feature information, whereby it is expected that the trajectory generated using the trajectory generation model will prevent the moving object from colliding with an obstacle.

Note that the trajectory generation unit 230 may sequentially generate the state of the moving object from the target state to the start state in reverse order instead of sequentially generating the state of the moving object from the start state to the target state as described above. In this case, the trajectory generation unit 230 inputs the feature amount vector of the set target state $S_N$ as the start state, and the feature amount vector of the set start state $S_0$ as the target state into the trajectory generation model. Accordingly, the trajectory generation unit 230 acquires the feature amount vector of the state $S_{N-1}$, which is just before the state $S_N$, as the "next state", which is the output of the trajectory generation model.

Alternatively, the trajectory generation unit 230 may alternately generate the state of the moving object from the start state to the target state and the state of the moving object from the target state to the start state. That is, the trajectory generation unit 230 may sequentially generate the state of the moving object from both sides of the start state and the target state. The processing in this case will be described later with reference to FIG. 9.

The trajectory generation unit 230 performs processing similar to the aforementioned processing for a dropout rate $D_2$, which is different from $D_1$. Accordingly, the trajectory generation unit 230 generates, for the dropout rate $D_2$, a trajectory $T_2$ that corresponds to the start state $S_0$ and the target state $S_N$, and the environmental feature information. The trajectory $T_2$ is shown by the broken line in FIG. 7. The trajectory generation unit 230 performs, for a further different dropout rate $D_3$, processing similar to the aforementioned processing. Accordingly, the trajectory generation unit 230 generates, for the dropout rate $D_3$, a trajectory $T_3$ that corresponds to the start state $S_0$ and the target state $S_N$, and the environmental feature information. The trajectory $T_3$ is shown by an alternate long and short dash line in FIG. 7.

When the dropout rate is changed, the percentage of the nodes (neurons) that are disabled in the trajectory generation model is changed. When, for example, the dropout rate is 5%, the percentage of the nodes (neurons) that are disabled in the trajectory generation model is 5%. On the other hand, when the dropout rate is 0%, the percentage of the nodes (neurons) that are disabled in the trajectory generation model is 0% (i.e., there is no node to be disabled). A change in the dropout rate causes a change in the node to be disabled in the trajectory generation model, whereby the configuration of the trajectory generation model is changed. Therefore, even when one input value is input into the trajectory generation model, if the dropout rate is different, the output of the trajectory generation model may be different.

For example, as shown in FIG. 7, the state $S_1$ output for the dropout rate $D_1$ (trajectory $T_1$), the state $S_1$, which is output for the dropout rate $D_2$ (trajectory $T_2$), and the state $S_1$ output for the dropout rate $D_3$ (trajectory $T_3$) may be different from one another. The other states (states other than the start state and the target state) may have results similar to those stated above. Therefore, the trajectory $T_1$, the trajectory $T_2$, and the trajectory $T_3$ may be different from one another.

Therefore, the trajectory generation unit 230 may generate trajectories different from one another for the dropout rates different from one another. Therefore, the trajectory generation unit 230 may generate a plurality of (a number of) trajectories different from one another by generating a trajectory for each of the dropout rates different from one another.

Further, the trajectory generation unit 230 may perform, for one dropout rate, processing of generating a trajectory that corresponds to the feature amount vectors of the start state $S_0$ and the target state $S_N$, and the environmental feature information multiple times. In this case, the trajectory generation unit 230 may increase the number of times the above processing of generating the trajectory at this dropout rate is performed when the dropout rate set in the trajectory generation model becomes larger. That is, when a value of the variable parameter (dropout rate) that makes the variation in the output of the learned model larger is set in the learned model, the trajectory generation unit 230 may increase the number of times the trajectory is generated by inputting the same start state and target state, and the same environmental feature information into the learned model.

The nodes of the trajectory generation model are randomly disabled at a percentage in accordance with the set dropout rate. In other words, nodes to be disabled for each inference process are randomly selected in accordance with the dropout rate. Accordingly, when, for example, processing of inferring the state $S_{n+1}$ from the state $S_N$ and the state $S_n$ is performed multiple times, different states $S_{n+1}$ may be inferred each time. That is, even when one dropout rate is set, the trajectory generated in the first processing and the trajectory generated in the second processing may be different from each other. Therefore, when the dropout rate is not 0, even when the processing of changing the dropout rate is not performed, different trajectories may be generated each time for multiple inference processes. Then, the higher the dropout rate is, the greater the number of combinations of nodes to be randomly disabled. Therefore, the higher the dropout rate is, the greater the variation in the output of the trajectory generation model is. Therefore, when the dropout rate is high, when the trajectory generation processing is repeatedly performed at this dropout rate, it is highly likely that a different trajectory will be generated for each process. On the other hand, when the dropout rate is low, even when the trajectory generation processing is repeatedly performed at this dropout rate, it is highly likely that the same trajectory will be generated. In this case, it is highly like that it makes no sense to perform the trajectory generation processing multiple times. Therefore, when the dropout rate set in the trajectory generation model is higher, many trajectories may be efficiently generated by increasing the number of times the aforementioned processing of generating the trajectory at the above dropout rate is performed.

The trajectory output unit 240 outputs the trajectories generated by the trajectory generation unit 230. The trajectory output unit 240 may cause the interface unit 18 to display the generated trajectories. Alternatively, the trajectory output unit 240 may output the generated trajectories to the ROM 14 or the RAM 16 in order to store the generated trajectories. Further, the trajectory output unit 240 may output (transmit) the trajectories to another apparatus.

The trajectory decision unit 250 decides a high-quality trajectory for the plurality of trajectories that have been generated according to predetermined criteria. In other words, the trajectory decision unit 250 selects a high-quality trajectory from the plurality of trajectories that have been generated according to the predetermined criteria. Assume, for example, it is defined that a trajectory that has a short length and does not collide with an obstacle (environmental object) is a high-quality trajectory at the criteria. In this case, the trajectory decision unit 250 aligns the trajectories in an ascending order of length. Then, the trajectory decision unit 250 checks the trajectories, from the shortest trajectory in order, to see if they collide with an obstacle. Accordingly, a trajectory that is short and does not collide with the obstacle is decided (selected). The length of the trajectory corresponds to the length of the trace of the point that corresponds to the feature amount vector indicating the state in the m-dimensional space when the number of dimensions of the state of the trajectory is m. Further, the method of checking whether or not the trajectory collides with the obstacle may be performed, for example, by a simulation where it is checked whether or not the moving object collides with the environmental object when the moving object is moved along the trajectory.

Figure 8:
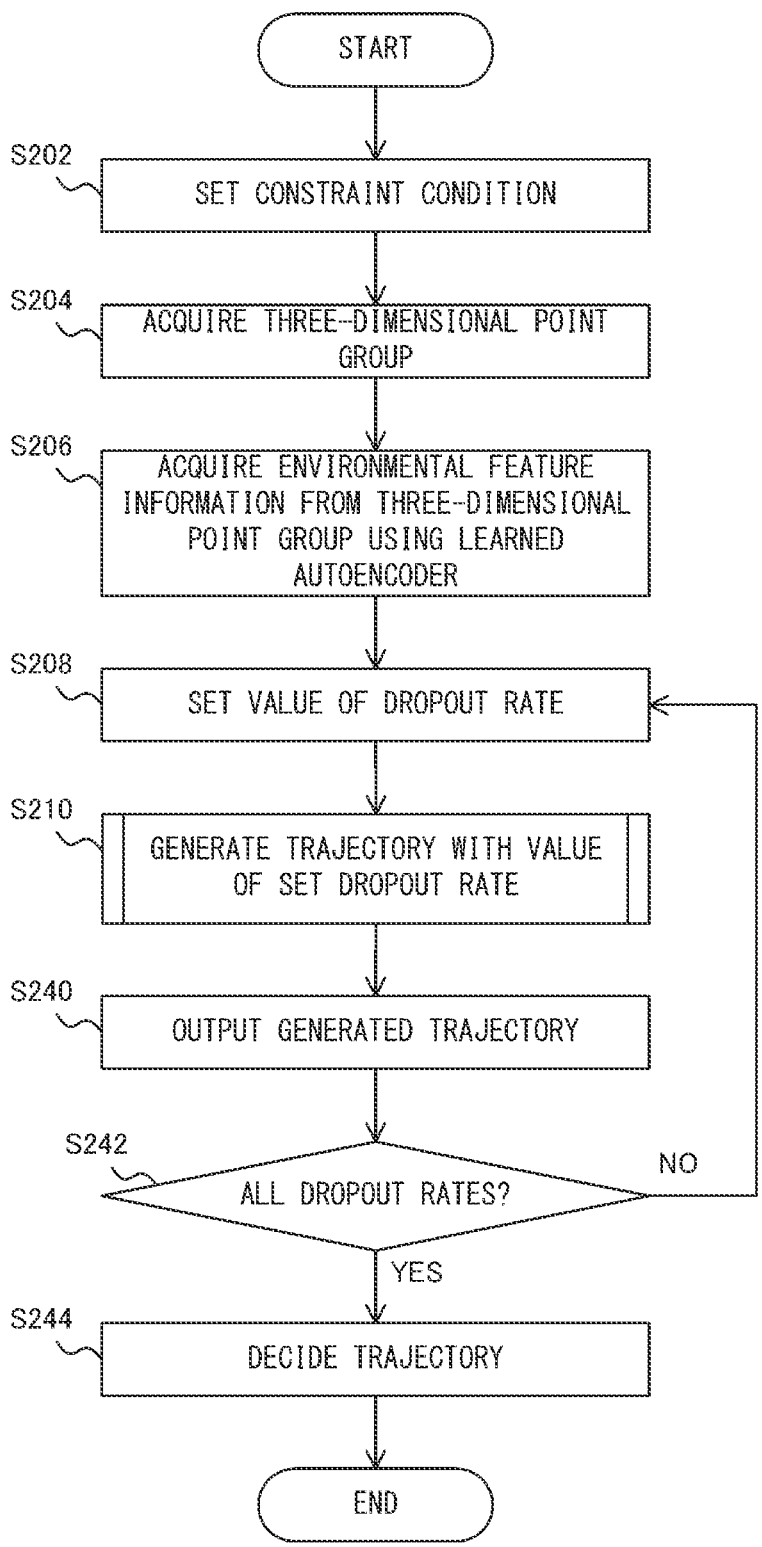
FIG. 8 is a flowchart showing a trajectory generation method executed by a trajectory generation apparatus according to the first embodiment.

FIG. 8 is a flowchart showing a trajectory generation method executed by the trajectory generation apparatus 200 according to the first embodiment. FIG. 8 shows a flow of trajectory generation processing executed by the trajectory generation apparatus 200. As described above, the condition setting unit 218 sets a constraint condition in the trajectory to be generated (Step S202). Accordingly, the start state and the target state of the trajectory to be generated are set. Further, in this processing, a plurality of values of the dropout rate that should be set in the trajectory generation model may be set in the parameter setting unit 220.

As described above, the point group acquisition unit 214 acquires the three-dimensional point group that corresponds to the environment (target environment) around the moving object whose trajectory is to be generated (Step S204). As described above, the environmental feature information acquisition unit 216 acquires the environmental feature information indicating the features of the environment around the moving object from the three-dimensional point group using the learned autoencoder (Step S206).

As described above, the parameter setting unit 220 sets the value of the dropout rate of the learned trajectory generation model (learned model) (Step S208). As described above, the trajectory generation unit 230 generates a trajectory with the value of the dropout rate set in S208 (Step S210). Specifically, the trajectory generation unit 230 inputs the feature amount vectors of the start state and the target state set in S202, and the environmental feature information acquired in S206 into the trajectory generation model (learned model) whose dropout rate is set to the value set in S208. Accordingly, a trajectory is generated. The details of the processing of S210 will be described later with reference to FIG. 9.

As described above, the trajectory generation unit 230 may repeat the processing of S210 with the value of the dropout rate the number of times in accordance with the magnitude of the value of the dropout rate. Accordingly, the greater the value of the dropout rate is, the more trajectories are generated.

As described above, the trajectory output unit 240 outputs the trajectory generated in the processing of S210 (Step S240). The trajectory generation apparatus 200 (e.g., the trajectory generation unit 230) determines whether the trajectory generation processing has been performed for all the values of the plurality of dropout rates prepared in advance (Step S242). When the trajectory generation processing has not been performed for at least one of the values of the plurality of dropout rates (NO in S242), the process flow proceeds to S208. Then, the parameter setting unit 220 sets the value of the dropout rate regarding which the trajectory generation processing has not been performed in the trajectory generation model (S208). Then, the trajectory generation unit 230 generates a trajectory with the set value of the dropout rate (S210).

On the other hand, when the trajectory generation processing has been performed for all the values of the plurality of dropout rates (YES in S242), as described above, the trajectory decision unit 250 decides a high-quality trajectory from the plurality of trajectories that have been generated according to predetermined criteria (Step S244). That is, the trajectory decision unit 250 evaluates the qualities of the plurality of trajectories that have been generated and selects a high-quality trajectory.

Figure 9:
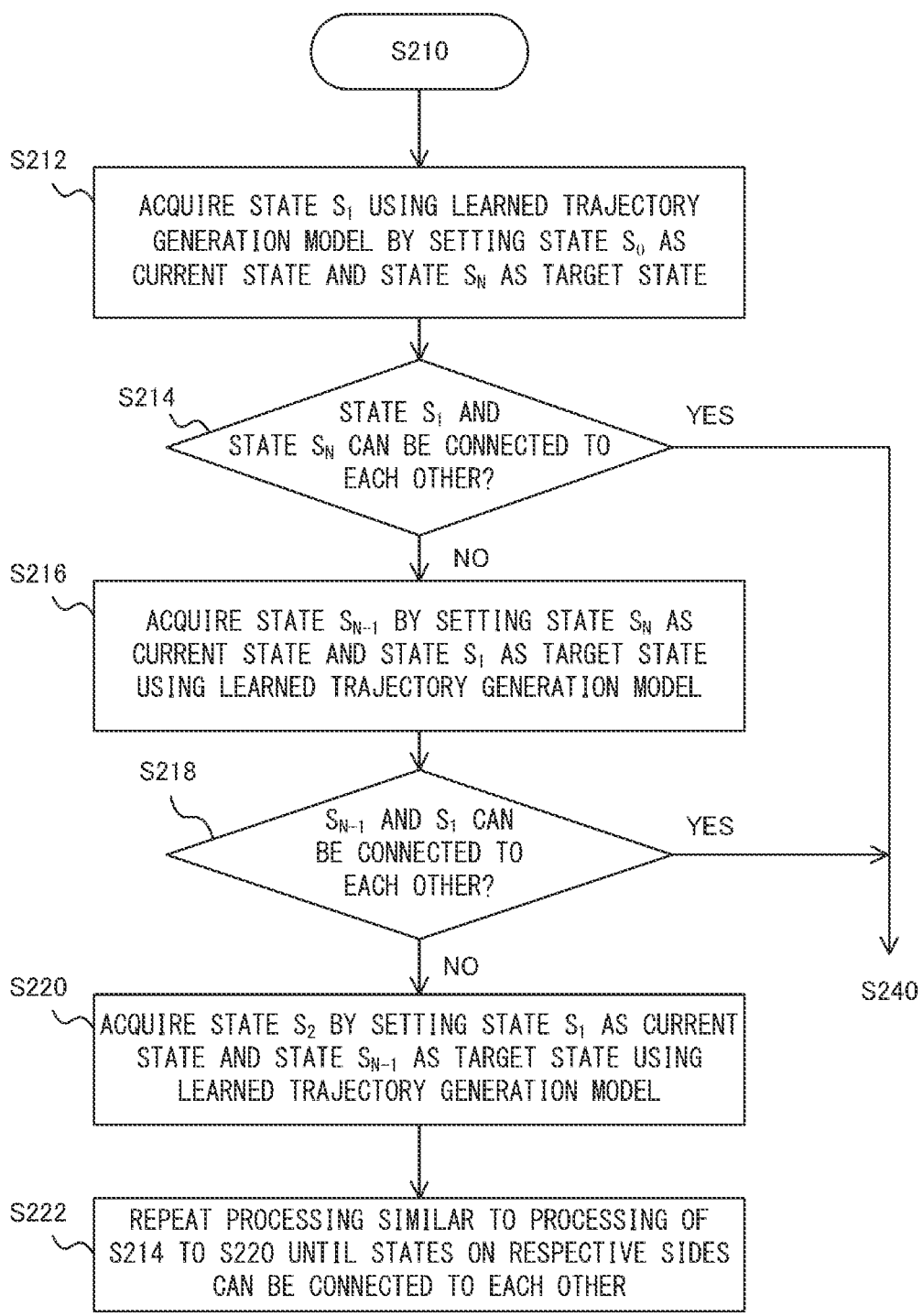
FIG. 9 is a flowchart showing trajectory generation processing executed by the trajectory generation unit according to the first embodiment.

FIG. 9 is a flowchart showing the trajectory generation processing (S210) executed by the trajectory generation unit 230 according to the first embodiment. Here, the start state set in the processing of S202 is denoted by a state $S_0$ and the target state set in the processing of S202 is denoted by a state $S_N$. It is further assumed that the feature amount vector of the state has an m dimensions.

The trajectory generation unit 230 acquires the state $S_1$ using the learned trajectory generation model by setting the state $S_0$ as the current state and the state $S_N$ as the target state (Step S212). Specifically, the trajectory generation unit 230 inputs the feature amount vectors of the current state (start state) $S_0$ and the target state $S_N$, and the environmental feature information into the learned trajectory generation model. The trajectory generation unit 230 acquires the feature amount vector of the state $S_1$, which is next to the state $S_0$, output from the trajectory generation model.

The trajectory generation unit 230 determines whether the state $S_1$ and the state $S_N$ can be connected to each other (Step S214). Specifically, the trajectory generation unit 230 determines whether or not there is a state in which the moving object collides with the obstacle (environmental object) in states on the line (in the m-dimensional space) that connects the state $S_1$ and the state $S_N$ (determination #1). More specifically, the trajectory generation unit 230 determines whether or not the moving object collides with (interferes with) the environmental object in each state between the state $S_1$ and the state $S_N$ when the state $S_1$ and the state $S_N$ are connected to each other at the shortest distance in the m-dimensional space. The determination regarding whether the moving object collides with the environmental object may be performed using the position coordinates of the space where the moving object is present in the state and the feature amount indicating the environmental object in the environmental feature information. Note that the position coordinates of the space where the moving object is present in one state are uniquely defined when the feature amount of the state of the moving object is defined.

Further, the trajectory generation unit 230 determines whether the distance between the state $S_1$ and the state $S_N$ is smaller than a predetermined threshold (determination #2). The distance between the state $S_1$ and the state $S_N$ may correspond to the distance between a point and another point indicated by the feature amount vector in the state $S_1$ and the feature amount vector in the state $S_N$ in the m-dimensional space. The trajectory generation unit 230 determines that the state $S_1$ and the state $S_N$ can be connected to each other when the determination #1 and the determination #2 are both satisfied.

When it is determined that the state $S_1$ and the state $S_N$ can be connected to each other (YES in S214), the generation of the trajectory is completed. Therefore, the process flow proceeds to S240. On the other hand, when it is determined that the state $S_1$ and the state $S_N$ cannot be connected to each other (NO in S214), the trajectory generation unit 230 generates states from the side of the target state in reverse order. That is, the trajectory generation unit 230 acquires the state $S_{N-1}$ by setting the state $S_N$ as the current state and the state $S_1$ generated in S212 as the target state using the learned trajectory generation model (Step S216).

Specifically, the trajectory generation unit 230 inputs the feature amount vectors of the current state $S_N$ and the target state $S_1$, and the environmental feature information into the learned trajectory generation model. The trajectory generation unit 230 acquires the feature amount vector of the state $S_{N-1}$, which is next to the state $S_N$, output from the trajectory generation model. On the generated trajectory, the state $S_{N-1}$ is a state which is immediately before the state $S_N$. However, regarding the input and the output of the trajectory generation model in this case, the state $S_{N-1}$ is output as "the state next to" the state $S_N$ since the input target state $S_1$ is a state which is closer to the start state than the current state $S_N$ is.

The trajectory generation unit 230 determines whether the state $S_{N-1}$ and the state $S_1$ can be connected to each other (Step S218). Since the method of determining whether two states can be connected to each other is substantially similar to the method in the processing of S214, the description thereof will be omitted. When it is determined that the state $S_{N-1}$ and the state $S_1$ can be connected to each other (YES in S218), the generation of the trajectory is completed. Therefore, the process flow proceeds to S240.

On the other hand, when it is determined that the state $S_{N-1}$ and the state $S_1$ cannot be connected to each other (NO in S218), the trajectory generation unit 230 acquires the state $S_2$ by setting the state $S_1$ as the current state and the state $S_{N-1}$ as the target state using the learned trajectory generation model (Step S220). Specifically, the trajectory generation unit 230 inputs the feature amount vectors of the current state $S_1$ and the target state $S_{N-1}$, and the environmental feature information into the learned trajectory generation model. The trajectory generation unit 230 acquires the feature amount vector of the state $S_2$, which is next to the state $S_1$, output from the trajectory generation model.

Then, the trajectory generation unit 230 repeats the processing similar to the processing of S214 to S220 until the states on the respective sides can be connected to each other (Step S222). That is, the trajectory generation unit 230 repeats processing similar to the processing of S214 to S220 until the next state output from the trajectory generation model can be connected to the target state input to the trajectory generation model. Therefore, in this case, like in S214, the trajectory generation unit 230 determines whether the state $S_2$ and the state $S_{N-1}$ can be connected to each other. When they can be connected to each other, then generation of the trajectory is completed. On the other hand, when they cannot be connected to each other, like in S216, the trajectory generation unit 230 acquires the state $S_{N-2}$ by setting the state $S_{N-1}$ as the current state and the state $S_2$ as the target state using the learned trajectory generation model. Then, like in S218, the trajectory generation unit 230 determines whether the state $S_{N-2}$ and the state $S_2$ can be connected to each other. Specifically, the trajectory generation unit 230 generates, by setting the state generated in the previous step as the target state and the state generated in the further previous step as the start state, a state which is just next to the start state on the side close to the target state.

By repeating the processing as described above, when the state $S_n$ has been output from the trajectory generation model by setting the state $S_{n-1}$ as the current state and the state $S_{n+1}$ as the target state (S220), the state $S_{n+1}$ and the state $S_n$ can be connected to each other (YES in S214). Alternatively, when the state $S_n$ has been output from the trajectory generation model (S216) by setting the state $S_{n+1}$ as the current state and the state $S_{n-1}$ as the target state, the state $S_{n-1}$ and the state $S_n$ can be connected to each other (YES in S218). Therefore, a trajectory in which the states are connected from the start state to the target state is generated.

Figure 10:
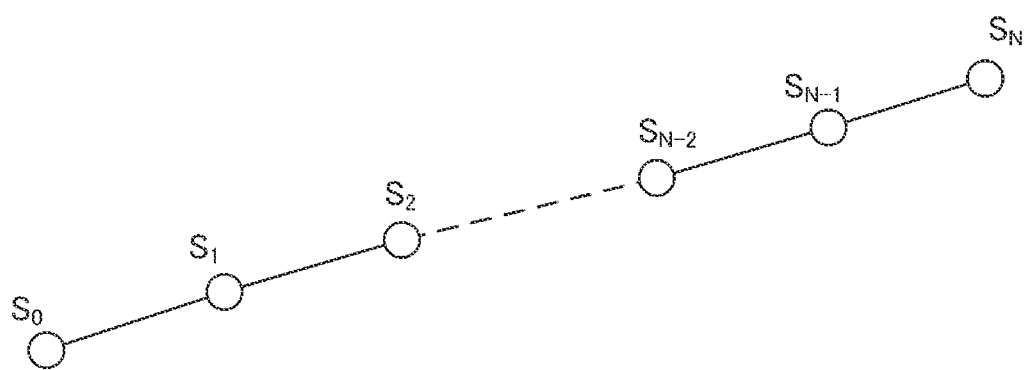
FIG. 10 is a diagram for describing generation of a plurality of trajectories by the trajectory generation unit according to the first embodiment.
Figure 11:
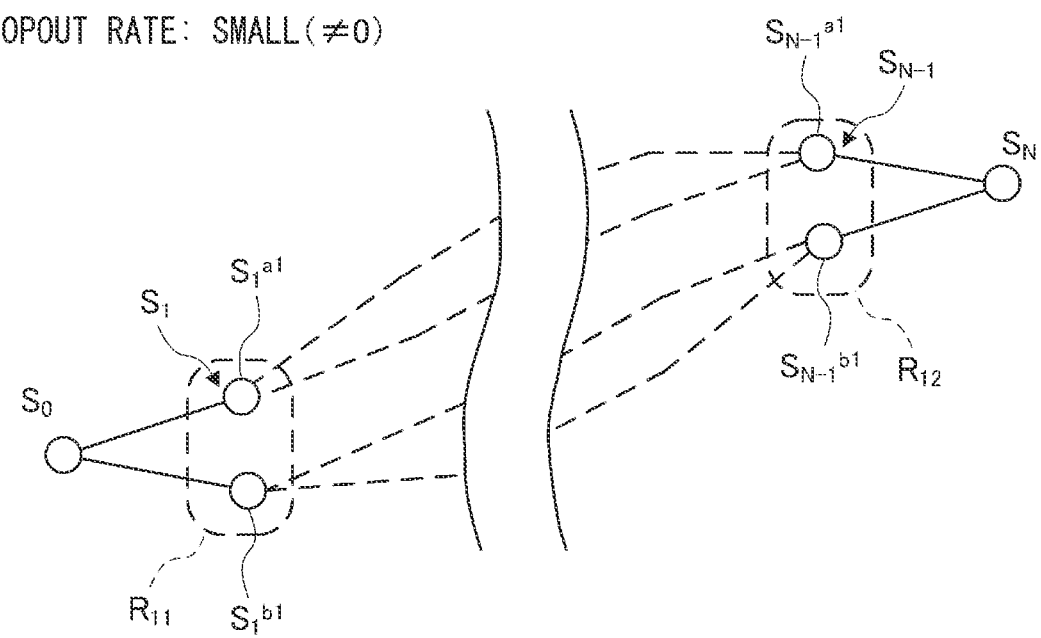
FIG. 11 is a diagram for describing generation of a plurality of trajectories by the trajectory generation unit according to the first embodiment.
Figure 12:
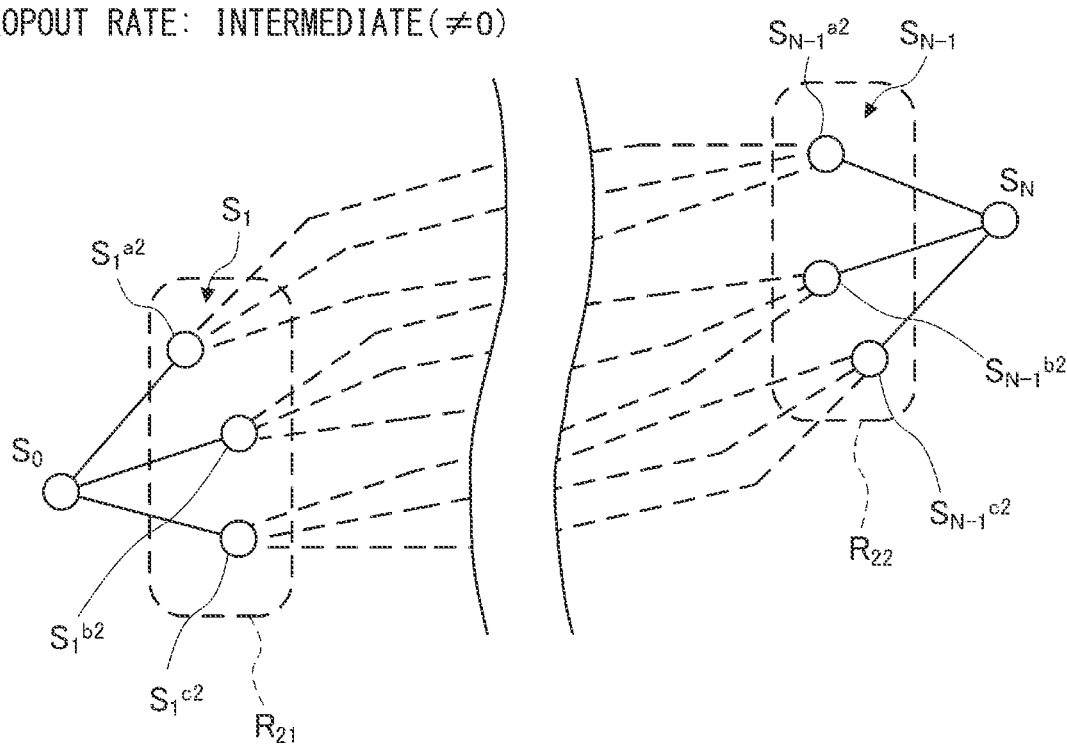
FIG. 12 is a diagram for describing generation of a plurality of trajectories by the trajectory generation unit according to the first embodiment.

FIGS. 10-12 are diagrams for describing that the trajectory generation unit 230 according to the first embodiment generates a plurality of trajectories. FIG. 10-12 each show points indicating the states in the m-dimensional space when the feature amount vectors of the states of the moving object have an m dimensions in a simulated manner (i.e., quasi manner). FIG. 10 shows trajectories generated by the method shown in FIG. 9 when the dropout rate D set in the trajectory generation model is 0.

When the dropout rate D set in the trajectory generation model is 0, the nodes (coupling of nodes) that form the trajectory generation model are all enabled. Therefore, when the input into the trajectory generation model is constant, its output is constant as well. Therefore, the state $S_1$ output from the trajectory generation model by setting the state $S_0$ as the current state and the state $S_N$ as the target state is uniquely defined. Further, the state $S_{N-1}$ output from the trajectory generation model by setting the state $S_N$ as the current state and the state $S_1$ as the target state is uniquely defined. In this manner, when the dropout rate D set in the trajectory generation model is 0, each state is uniquely defined, and the trajectory that is generated is uniquely defined as well. The trajectory generated when the dropout rate D set in the trajectory generation model is 0 is the output by the algorithm as learned in the learned trajectory generation model. Therefore, the trajectory generated when the dropout rate D set in the trajectory generation model is 0 is the optimal trajectory in terms of the result of the learning of this learned trajectory generation model.

FIG. 11 shows trajectories generated by the method shown in FIG. 9 when the dropout rate D set in the trajectory generation model is a small value that is not 0, i.e., $D_1$ ($\neq 0$). When the dropout rate D set in the trajectory generation model is not 0, the nodes (coupling of nodes) that form the trajectory generation model are randomly disabled in accordance with the dropout rate. Therefore, even when the input into the trajectory generation model is constant, when the trajectory generation processing is performed multiple times, the outputs may be different from one another.

Therefore, the state $S_1$ output from the trajectory generation model by setting the state $S_0$ as the current state and the state $S_N$ as the target state is not uniquely defined. When the dropout rate $D_1$ set in the trajectory generation model is a small value, the variation in the output is small. Therefore, while the state $S_1$ that is output from the trajectory generation model is not uniquely defined, its variation is small. In the example shown in FIG. 11, the state $S_1$ output from the trajectory generation model by setting the state $S_0$ as the current state and the state $S_N$ as the target state may become a state $S_1^{a1}$ or a state $S_1^{b1}$ in a region $R_{11}$ indicating the variation that corresponds to the dropout rate $D_1$. The algorithm of the trajectory generation model when the dropout rate D is $D_1$ ($\neq 0$) may be different from that when the dropout rate D is 0. Therefore, the state $S_1^{a1}$ and the state $S_1^{b1}$ when D=$D_1$ (FIG. 11) may be different from the state $S_1$ when D=0 (FIG. 10).

Likewise, while the state $S_{N-1}$ output from the trajectory generation model by setting the state $S_N$ as the current state and the state $S_1$ as the target state is not uniquely defined, its variation is small. In the example shown in FIG. 11, the state $S_{N-1}$ output from the trajectory generation model by setting the state $S_N$ as the current state and the state $S_1$ as the target state may become a state $S_{N-1}^{a1}$ or a state $S_{N-1}^{b1}$ in a region $R_{12}$ indicating the variation that corresponds to the dropout rate $D_1$. Then, the state $S_{N-1}^{a1}$ and the state $S_{N-1}^{b1}$ when D=$D_1$ (FIG. 11) may be different from the state $S_{N-1}$ when D=0 (FIG. 10).

As described above, when the dropout rate set in the trajectory generation model is not 0, the state output from the trajectory generation model is not uniquely defined and may be different from the state output from the trajectory generation model when the dropout rate is 0. When this output state is input into the trajectory generation model as the current state or the target state, the state to be output further varies. Therefore, the trajectory that is generated when the dropout rate is not 0 is not uniquely defined. Therefore, when the trajectory generation processing is performed multiple times, trajectories different from each other may be generated. When the dropout rate is a relatively small value $D_1$, the variation in the plurality of trajectories that are generated is relatively small.

FIG. 12 shows trajectories that are generated by the method shown in FIG. 9 when the dropout rate D set in the trajectory generation model is a value $D_2$, which is larger than $D_1$. Note that $D_2$ is not 0. Therefore, the state $S_1$ output from the trajectory generation model by setting the state $S_0$ as the current state and the state $S_N$ as the target state is not uniquely defined. Since the dropout rate $D_2$ set in the trajectory generation model is a value larger than $D_1$, the variation of the output becomes larger than that in the case of FIG. 11. Therefore, the state $S_1$ that is output from the trajectory generation model is not uniquely defined, and its variation is larger than that in the case of FIG. 11.

In the example shown in FIG. 12, the state $S_1$ output from the trajectory generation model by setting the state $S_0$ as the current state and the state $S_N$ as the target state may become a state $S_1^{a2}$, a state $S_1^{b2}$ or a state $S_1^{c2}$ in a region $R_{21}$ indicating the variation that corresponds to the dropout rate $D_2$. The algorithm of the trajectory generation model when the dropout rate D is $D_2$ ($\neq 0$) may be different from those when the dropout rates D are 0 and $D_1$. Therefore, the state $S_1^{a1}$, the state $S_1^{b2}$ and the state $S_1^{c2}$ when $D=D_2$ (FIG. 12) may be different from the state $S_1$, the state $S_1^{a1}$ and the state $S_1^{b1}$.

Further, the state $S_{N-1}$ output from the trajectory generation model by setting the state $S_N$ as the current state and the state $S_1$ as the target state is not uniquely defined and its variation is larger than that in the case of FIG. 11. In the example shown in FIG. 12, the state $S_{N-1}$ output from the trajectory generation model by setting the state $S_N$ as the current state and the state $S_1$ as the target state may become a state $S_{N-1}^{a2}$, a state $S_{N-1}^{b2}$ or a state $S_{N-1}^{c2}$ in a region $R_{22}$ indicating the variation that corresponds to the dropout rate $D_2$. Then, the state $S_{N-1}^{a2}$, the state $S_{N-1}^{b2}$ and the state $S_{N-1}^{c2}$ when $D=D_2$ (FIG. 12) may be different from the state $S_{N-1}$, the state $S_{N-1}^{a1}$, and the state $S_{N-1}^{b1}$.

As described above, when the dropout rate set in the trajectory generation model is not 0, the state output from the trajectory generation model is not uniquely defined and may be different from the state output from the trajectory generation model when the dropout rate is 0. Therefore, since the trajectory that is generated when the dropout rate is not 0 is not uniquely defined, when the trajectory generation processing is performed multiple times, trajectories different from each other may be generated. When the dropout rate is a value $D_2$, which is larger than $D_1$, the variation in the plurality of trajectories that are generated becomes larger than that in the case in which the dropout rate is $D_1$. Therefore, when the dropout rate of the trajectory generation model is large, by performing the trajectory generation processing multiple times, many trajectories may be generated. Further, by performing trajectory generation processing for each of the values of the dropout rate that are different from one another, trajectories different from one another may be generated. Therefore, by performing trajectory generation processing for each of the values of the dropout rate that are different from one another, a large variety of trajectories different from one another may be generated.

It may seem that there is no need to generate a plurality of trajectories since an optimal trajectory is generated when a trajectory is generated using the learned trajectory generation model (dropout rate=0). However, generation of the trajectory using the learned trajectory generation model does not necessarily mean that the optimal trajectory is always generated, in accordance with criteria when the trajectory is decided. The criteria when the trajectory is decided (selected) do not necessarily correspond to the algorithm of the trajectory generation model since the criteria are freely defined by the user. Further, it is not easy to perform learning so that a completely optimal trajectory can be generated at the stage of learning the trajectory generation model. Further, it is possible that the features of all the environmental objects cannot be captured when the three-dimensional point group is acquired in the inference stage (trajectory generation processing). This is because it is possible that the obstacle that cannot be seen from the viewpoint when the three-dimensional point group is acquired may not be indicated in the three-dimensional point group. In this case, when the learned trajectory generation model (dropout rate=0) is used, a trajectory in which the moving object collides with an environmental object whose features have not been captured may be generated. Therefore, it is very important that a plurality of trajectories be generated.

Further, in the aforementioned first embodiment, the values of the dropout rate in the trajectory generation model (learned model) where the dropout layer is provided are changed and the trajectory is generated using the trajectory generation model for each of the dropout rates that have been changed. Accordingly, in the first embodiment, a plurality of trajectories are generated. Further, when the dropout rate set in the trajectory generation model is small, the variation in the generated trajectories becomes small, as a result of which a trajectory that is similar to the trajectory that corresponds to the learned algorithm is generated. On the other hand, when the dropout rate is large, the variation in the generated trajectories becomes large, whereby a trajectory that is relatively different from the trajectory that corresponds to the learned algorithm may be generated as well. Therefore, with the configuration according to the first embodiment, a wide variety of trajectories may be generated. Further, in this manner, the dropout rate, which is an existing variable parameter in a neural network, is configured to be changed, whereby a plurality of trajectories may be generated relatively easily.

Further, the trajectory generation system 1 according to the first embodiment described above is configured to generate a trajectory by inputting the start state and the target state of the moving object, and the environmental feature information into the learned trajectory generation model (learned model). Accordingly, a collision with the obstacle indicated in the environmental feature information can be prevented, and the trajectory from the start state to the target state may be generated. Further, the trajectory generation system 1 according to the first embodiment described above is configured to generate, for each of a plurality of different values of a variable parameter (first parameter) that can be changed, a trajectory using the learned trajectory generation model. Accordingly, with the trajectory generation system 1 according to the first embodiment described above, a plurality of trajectories may be generated. Therefore, the trajectory generation system 1 according to the first embodiment described above is able to decide a high-quality trajectory from the plurality of trajectories that have been generated.

Further, in the aforementioned first embodiment, the environmental feature information is input into the trajectory generation model in the learning processing and the inference processing. Accordingly, even when the value of the dropout rate is changed in the inference processing (trajectory generation processing), it is highly likely that a trajectory that can prevent the moving object from colliding with an obstacle will be generated. Accordingly, it becomes easy to perform the processing of deciding the high-quality trajectory in the trajectory decision processing (S244 in FIG. 8). When this trajectory decision processing is performed by a computer, if a trajectory that prevents the moving object from colliding with an obstacle has been generated, the computational cost of the processing of checking whether the moving object collides with an obstacle can be reduced.

Further, in the aforementioned first embodiment, the variable parameter (first parameter) is such a parameter that the variation in the output of the learned model in response to one input value input into the learned model (learned trajectory generation model) is changed in accordance with a change in the value of the first parameter. According to the above configuration, a wide variety of trajectories may be generated, like in the example of the dropout rate described above.

Further, the trajectory generation system 1 according to the above first embodiment is configured to increase the number of times that it generates a trajectory by inputting the same start state and target state, and the same environmental feature information into the learned model when a value of the variable parameter (first parameter) with which the variation in the output of the learned model (learned trajectory generation model) becomes larger is set in the learned model. Accordingly, like in the example of the dropout rate described above, many trajectories can be efficiently generated.

Implementation Example

Next, an implementation example of the trajectory generation system 1 according to the first embodiment will be described.

Figure 13:
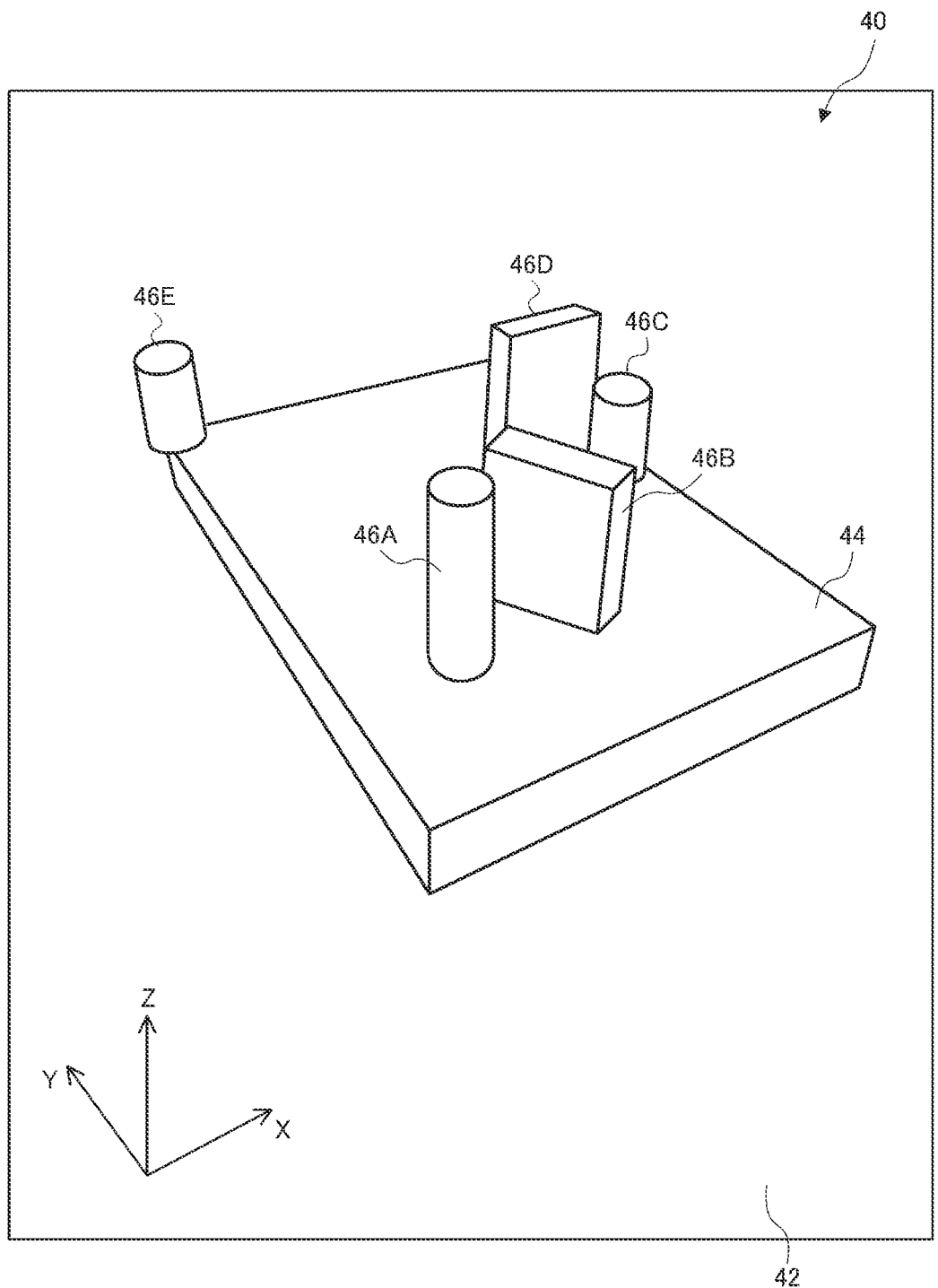
FIG. 13 is a diagram illustrating an environment according to an implementation example.

FIG. 13 is a diagram illustrating an environment 40 according to the implementation example. The environment 40 according to the implementation example may be implemented in the virtual space that simulates the real space. While a configuration implemented in the virtual space will be described in the following description, all the configurations that may be implemented in the virtual space may be implemented in the real space as well.

The environment 40 may be generated on the virtual space by, for example, a simulator such as a Gazebo simulator. An XYZ coordinate system (three-dimensional coordinate system) virtually set may be set in the environment 40. Accordingly, the position of the substance (an environmental object) that is present in the environment 40 can be indicated. In the following description, the Z-axis positive direction indicates the upward direction and the Z-axis negative direction indicates the downward direction. Further, environmental data indicating the environment 40 may indicate at which position coordinates the environmental object is present and at which position coordinates the environmental object is not present in the three-dimensional coordinate system set in the environment 40. In other words, the environmental data indicating the environment 40 may indicate, for each of the three-dimensional coordinates of the three-dimensional coordinate system set in the environment 40, whether the environmental object is present.

In the environment 40 illustrated in FIG. 13, a floor surface 42, a table 44, and gripping objects 46A-46E are present as environmental objects. The table 44 is placed on the floor surface 42 and the gripping objects 46 are placed on the table 44. It should be noted that the environment 40 shown in FIG. 13 is merely an example of an environment regarding the implementation of the trajectory generation system 1. The environmental objects that are present in the environment are not limited to those illustrated in FIG. 13.

The gripping objects 46 may be gripped by a gripper of a mobile body that will be described later with reference to FIG. 14. When one gripping object 46 is to be gripped, the other gripping objects 46 may become obstacles that disturb the movement of the mobile body. When, for example, the mobile body grips the gripping object 46D, the other gripping objects 46A, 46B, 46C, and 46E may become obstacles.

Figure 14:
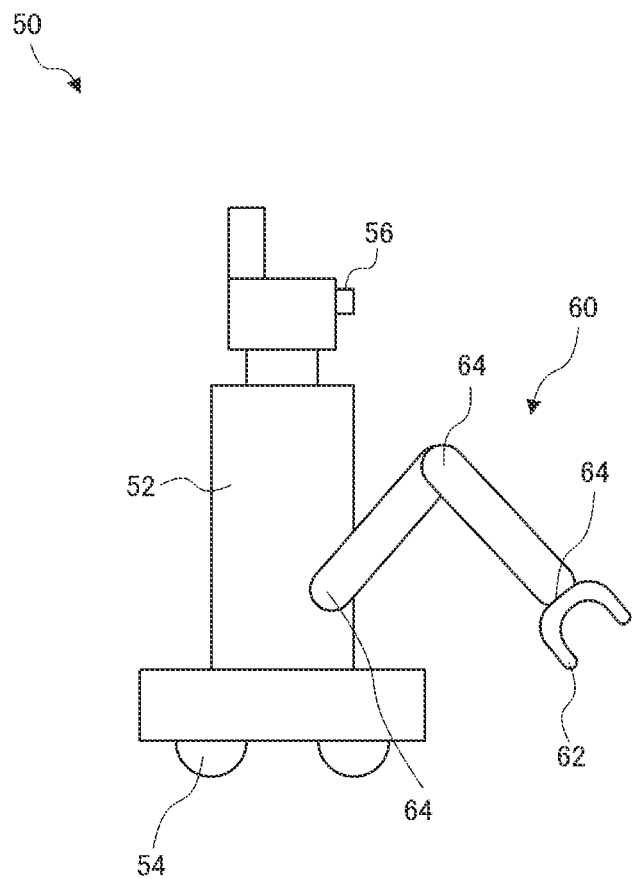
FIG. 14 is a diagram illustrating a mobile body according to the implementation example.

FIG. 14 is a diagram illustrating a mobile body 50 according to the implementation example. The mobile body 50 according to the implementation example may be implemented in the virtual space that simulates the real space. The mobile body 50 according to the implementation example is a virtual substance that moves within the environment 40 implemented in the virtual space. The mobile body 50 may be generated on the virtual space by, for example, a simulator such as a Gazebo simulator. The mobile body 50 is, for example, a robot or a movable base.

The mobile body 50 includes a main body part 52, a driving part 54, a camera 56, and an arm part 60. The arm part 60 includes a gripper 62 and a joint 64. The main body part 52 forms the trunk of the mobile body 50. The arm part 60 is disposed on a side of the main body part 52. The driving part 54 is disposed below the main body part 52. The camera 56 is disposed above the main body part 52.

The driving part 54 moves the main body part 52. The driving part 54 moves the main body part 52 back and forth, left and right, and turns the main body part 52. The camera 56 is, for example, an RGB-D camera. The camera 56 captures images of the environment 40 around the mobile body 50 and acquires a three-dimensional point group indicating the environmental object (e.g., the floor surface 42 and the gripping objects 46) in the environment 40. The angle of view of the camera 56 may be variable.

The gripper 62 is, for example, a robot hand. The gripper 62 is able to grip the gripping object 46. The arm part 60 may be provided with, for example, five joints 64. Rotation of the joints 64 enables the position and the posture of the gripper 62 with respect to the main body part 52 to be controlled.

The position coordinates of the main body part 52 in the environment 40 are denoted by $(x, y)$. Further, the orientation (turning angle) of the main body part 52 in the environment 40 is denoted by $\theta$. Further, the angles of the respective five joints 64 of the arm part 60 are denoted by $(\varphi 1, \varphi 2, \varphi 3, \varphi 4, \varphi 5)$. In this case, the position and the posture of the gripper 62 may be expressed by $(x, y, \theta, \varphi 1, \varphi 2, \varphi 3, \varphi 4, \varphi 5)$. That is, the state of the gripper 62, which is a moving object, may be specified by an eight-dimensional feature amount vector $(x, y, \theta, \varphi 1, \varphi 2, \varphi 3, \varphi 4, \varphi 5)$. Then, when the target state indicates that the gripper 62 grips the gripping object 46 as a result of movement of the mobile body 50 in the environment 40, the trajectory of the gripper 62 of the mobile body 50 may be expressed by the trace (change) of $(x, y, \theta, \varphi 1, \varphi 2, \varphi 3, \varphi 4, \varphi 5)$. That is, the trajectory of the gripper 62 may correspond to the trace of the point indicated by the feature amount vector (x, y, θ, φ1, φ2, φ3, φ4, φ5) in the eight-dimensional space.

The learning processing in the implementation example will be described. In the implementation example, the training data acquisition unit 110 acquires a large number of pieces of teacher environmental data indicating a teacher environment implemented in the virtual space like the environment 40. The training data acquisition unit 110 acquires, for example, about 30,000 patterns of teacher environment that are different from one another. The teacher environment may be generated on the virtual space of the three-dimensional space by a simulator such as a Gazebo simulator, like the environment 40.

Further, the training data acquisition unit 110 acquires, in each teacher environment, the three-dimensional point group acquired from the viewpoint of the camera 56 of the mobile body 50 that is present in the teacher environment. In the following processing, in order to improve the efficiency of data processing, not all the points in the obtained three-dimensional point group need to be used, and points that have been thinned out by a desired percentage may be used. When, for example, the obtained three-dimensional point group is 640×480 points, 64×48 points may be used.

Further, the training data acquisition unit 110 acquires a teacher trajectory, which is the trajectory of the mobile body 50 in the obtained teacher environment. In the implementation example, a case in which the gripper 62 of the mobile body 50 grips one of the gripping objects 46 placed on the table 44 in the teacher environment such as the environment 40 is assumed. Therefore, in the teacher trajectory, the target state corresponds to the position and the posture of the mobile body 50 (the gripper 62) when the gripper 62 grips the gripping object 46 that should be gripped. The target state may be expressed by the feature amount vector (x, y, θ, φ1, φ2, φ3, φ4, φ5) of the gripper 62 at this time. A plurality of target states (e.g., 5-16 target states) may be set for each of the gripping objects 46 in the teacher environment. Further, the start state may be set randomly in the teacher environment. The start state may be, for example, a state when the mobile body 50 is sufficiently away from the table 44. Then, the teacher trajectory corresponds to the trace of the feature amount vector (x, y, θ, φ1, φ2, φ3, φ4, φ5) indicating the state of the mobile body 50 (gripper 62) from the start state to the target state.

The teacher trajectory may be generated by a method that does not use machine learning. For example, the teacher trajectory may be generated by a Rapidly-Exploring Random Tree (RRT) algorithm such as a Constrained Bidirectional RRT (CBiRRT2). Further, as described above, in the teacher environment, the gripping objects 46 other than the gripping object 46 that should be gripped may become obstacles which disturb the movement of the mobile body 50. Therefore, the teacher trajectory may be generated in such a way that a component (e.g., the arm part 60) of the mobile body 50 does not collide with the gripping objects 46 other than the gripping object 46 that should be gripped from the start state to the target state in the teacher environment.

Further, in the implementation example, the autoencoder learning unit 120 performs processing of learning the autoencoder using the three-dimensional point group acquired by the training data acquisition unit 110. The autoencoder learning unit 120 performs processing of learning the autoencoder using the three-dimensional point group in about 30,000 patterns of teacher environment stated above. In the implementation example, the autoencoder compresses the dimension of the three-dimensional point group (e.g., 9216 dimensions) that has been input, to, for example, 256 dimensions. Therefore, 256-dimensional environmental feature information is acquired (extracted) using the autoencoder according to the implementation example.

Further, in the implementation example, the trajectory generation model learning unit 130 performs processing of learning the trajectory generation model by the aforementioned method using the teacher trajectory acquired by the training data acquisition unit 110. In the implementation example, the trajectory generation model is implemented by a neural network. In the implementation example, the division point $P_n$ shown in FIG. 5 corresponds to the feature amount vector (x, y, θ, φ1, φ2, φ3, φ4, φ5) in the state of the n-th division point from the start state.

Further, in the implementation example, the trajectory generation model 20 illustrated in FIG. 6 is composed of one input layer 22 and 10 fully connected layers 24-1 to 24-10. Further, in the implementation example, j=256 and m=8. Therefore, the number of dimensions (the number of nodes) of the input layer 22 is 272. Further, in the implementation example, the numbers of dimensions of the fully connected layers 24-1 to 24-10 are 1280, 1024, 896, 768, 512, 384, 256, 128, 64, 8, respectively.

The trajectory generation processing (inference processing) according to the implementation example will be described. In the implementation example, the target position of the mobile body 50 and the target posture of the gripper 62 are set. The condition setting unit 218 sets the gripping object 46 to be gripped. Then, the condition setting unit 218 sets the posture of the gripper 62 when the gripper 62 grips the gripping object 46 as a target state. Then, the condition setting unit 218 sets the feature amount vector (x, y, θ, φ1, φ2, φ3, φ4, φ5) that corresponds to the target state. Further, the condition setting unit 218 sets the feature amount vector (x, y, θ, φ1, φ2, φ3, φ4, φ5) of the gripper 62 that corresponds to the start state. The condition setting unit 218 sets, for example, the current state (the position and the posture) of the mobile body 50 (the gripper 62) in the environment as a start state.

Further, in the implementation example, the point group acquisition unit 214 acquires a three-dimensional point group that corresponds to an environment, which is around the mobile body 50 (the gripper 62) whose trajectory is to be generated and is implemented in the virtual space such as the environment 40. In this case, the point group acquisition unit 214 may acquire a 9216-dimensional three-dimensional point group by the camera 56 of the mobile body 50 which is in the start state. Further, the environmental feature information acquisition unit 216 extracts 256-dimensional environmental feature information using the learned autoencoder.

Further, in the implementation example, the parameter setting unit 220 sets the value of the dropout rate of the trajectory generation model by causing the interface unit 18 to display a program that indicates the trajectory generation model. Further, in the implementation example, the trajectory generation unit 230 generates a trajectory of the mobile body 50 (the gripper 62) from the start state (start posture) to the target state (target posture) by the aforementioned method. Further, as described above, by generating a trajectory by changing the value of the dropout rate of the trajectory generation model, a wide variety of trajectories are generated for one constraint condition (the start state and the target state).

Modified Examples

The present disclosure is not limited to the aforementioned embodiment and may be changed as appropriate without departing from the spirit of the present disclosure. For example, the order of the steps in the flowcharts described above may be changed as appropriate. Further, one or more steps in the flowcharts described above may be omitted as appropriate.

For example, in the flowchart shown in FIG. 4, the processing of S122 may be executed before the processing of S112. Further, in the flowchart shown in FIG. 8, the processing of S202 may be executed after the processing of S206. Further, in the flowchart shown in FIG. 8, the processing of S244 may be omitted.

Further, in the trajectory generation apparatus 200, the trajectory decision unit 250 may not be provided. In this case, the processing performed by the trajectory decision unit 250 may be performed by the user. That is, the user may decide (select) the optimal trajectory from a plurality of trajectories that have been generated.

Further, in the aforementioned embodiment, in the processing of S124 in FIG. 4, the trajectory generation model learning unit 130 inputs the environmental feature information, and the feature amount vectors that correspond to one point $P_n$ and the final point $P_N$ into the trajectory generation model, and optimizes various kinds of parameters of the trajectory generation model in such a way that the difference between the feature amount vector that corresponds to $P_{n+1}$ and the feature amount vector output from the trajectory generation model becomes small. However, the configuration of this embodiment is not limited to the above-described one. The trajectory generation model learning unit 130 may input the environmental feature information, and the feature amount vectors that correspond to one point $P_n$ and the start point $P_0$ into the trajectory generation model and optimize various kinds of parameters of the trajectory generation model in such a way that the difference between the feature amount vector that corresponds to $P_{n-1}$ and the feature amount vector output from the trajectory generation model becomes small. Alternatively, the trajectory generation model learning unit 130 may alternately perform the processing of inputting the feature amount vectors that correspond to one point $P_n$ and the final point $P_N$ into the trajectory generation model and the processing of inputting the feature amount vectors that correspond to one point $P_n$ and the start point $P_0$ into the trajectory generation model.

Further, in the above-described examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM, CD-R, CD-R/W, and semiconductor memories (such as mask ROM, Programmable ROM (PROM), Erasable PROM (EPROM), flash ROM, RAM, etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A trajectory generation system that generates a trajectory of a moving object that moves in an environment, the trajectory generation system comprising:
an environmental feature information acquisition unit configured to acquire environmental feature information indicating features of the environment around the moving object; and
a trajectory generation unit configured to input a start state and a target state of the moving object, and the environmental feature information into a learned model that is generated by machine learning in advance and is used to generate a trajectory along which the moving object can move in the environment, and generate, for each of a plurality of different values of a first parameter that is set in the learned model and can be changed, a trajectory using the learned model, wherein:
the first parameter is such a parameter that a variation in an output of the learned model for one input value input into the learned model is changed in accordance with a change in the value of the first parameter,
the first parameter is a dropout rate in the learned model where a dropout layer is provided, and
the trajectory generation unit generates a plurality of trajectories by generating a trajectory using the learned model for each of the dropout rates.

2. The trajectory generation system according to claim 1, wherein the trajectory generation unit increases the number of times a trajectory is generated by inputting the same start state and target state, and the same environmental feature information into the learned model when a value of the first parameter such that the variation in the output of the learned model becomes larger is set in the learned model.

3. The trajectory generation system according to claim 1, further comprising a parameter setting unit capable of setting each of a plurality of values of the first parameter that are different from one another in the learned model.

4. A trajectory generation method for generating a trajectory of a moving object that moves in an environment, the trajectory generation method comprising:
acquiring environmental feature information indicating features of the environment around the moving object; and
inputting a start state and a target state of the moving object, and the environmental feature information into a learned model that is generated by machine learning in advance and is used to generate a trajectory along which the moving object can move in the environment, and generating, for each of a plurality of different values of a first parameter that is set in the learned model and can be changed, a trajectory using the learned model, wherein:
the first parameter is such a parameter that a variation in an output of the learned model for one input value input into the learned model is changed in accordance with a change in the value of the first parameter,
the first parameter is a dropout rate in the learned model where a dropout layer is provided, and
a plurality of trajectories are generated by generating a trajectory using the learned model for each of the dropout rates.

5. A non-transitory computer readable medium storing a program for causing a computer to execute the following processing of:

acquiring environmental feature information indicating features of an environment around a moving object; and inputting a start state and a target state of the moving object, and the environmental feature information into a learned model that is generated by machine learning in advance and is used to generate a trajectory along which the moving object can move in the environment, and generating, for each of a plurality of different values of a first parameter that is set in the learned model and can be changed, a trajectory using the learned model, wherein:

the first parameter is such a parameter that a variation in an output of the learned model for one input value input into the learned model is changed in accordance with a change in the value of the first parameter, the first parameter is a dropout rate in the learned model where a dropout layer is provided, and a plurality of trajectories are generated by generating a trajectory using the learned model for each of the dropout rates.

* * * * *